US008233416B2

(12) United States Patent
Shirota et al.

(10) Patent No.: US 8,233,416 B2
(45) Date of Patent: Jul. 31, 2012

(54) HANDOFF SUPPORTS FOR NETWORKS HAVING DIFFERENT LINK ESTABLISHMENT PROTOCOLS

(75) Inventors: Masakazu Shirota, Yokohamashi (JP); Jun Wang, La Jolla, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 11/233,676

(22) Filed: Sep. 22, 2005

(65) Prior Publication Data
US 2006/0092878 A1 May 4, 2006

Related U.S. Application Data

(60) Provisional application No. 60/614,215, filed on Sep. 28, 2004.

(51) Int. Cl.
*H04B 7/00* (2006.01)
*H04W 4/00* (2009.01)
(52) U.S. Cl. ..................... 370/310.2; 370/331
(58) Field of Classification Search ............... 370/310.2, 370/331
See application file for complete search history.

(56) References Cited

U.S. PATENT DOCUMENTS

| 5,764,903 | A | 6/1998 | Yu |
| 6,370,118 | B1 | 4/2002 | Lioy et al. |
| 6,487,218 | B1 * | 11/2002 | Ludwig et al. ................ 370/469 |
| 6,614,803 | B1 | 9/2003 | Farnsworth et al. |
| 6,651,105 | B1 * | 11/2003 | Bhagwat et al. .............. 709/239 |
| 7,366,151 | B2 | 4/2008 | Kubler et al. |
| 7,453,844 | B1 * | 11/2008 | Lee et al. ...................... 370/329 |
| 2002/0097707 | A1 | 7/2002 | Balazinski et al. |
| 2002/0145993 | A1 * | 10/2002 | Chowdhury et al. .......... 370/338 |

(Continued)

FOREIGN PATENT DOCUMENTS
EP 1434404 A1 6/2004
(Continued)

OTHER PUBLICATIONS

3rd Generation Partnership Project 2 "3GPP2" *cdma2000 Wireless IP Network standard: Packet Data Mobility and Resource Management*, 3GPP2 X.S0011-003-C; Aug. 2003; pp. 1-24.

(Continued)

*Primary Examiner* — Marisol Figueroa
(74) *Attorney, Agent, or Firm* — Kam T. Tam; Kristine U. Ekwueme

(57) ABSTRACT

In a communication system in which a roaming node seeking network access among different networks which are implemented with different network interface layer protocols, handoff schemes are instituted whereby the node may freely move from one network to another with reduced levels of interruptions with respect to the network access. Prior to and at the onset of a handoff, the node receives an indication for the handoff. The indication may be embodied in various forms such as a signal message indicating a change of the SID (System Identification), NID (Network Identification), or PZID (Packet Zone Identification). Alternatively, the indication can be in the form of information straightforwardly included in a data packet sent to the roaming node prior to the handoff. As another alternative, the indication can be implemented as distinguishable message patterns sent to the node in which different message patterns can be sent by different networks supporting different network interface layer protocols.

50 Claims, 14 Drawing Sheets

U.S. PATENT DOCUMENTS

| | | | |
|---|---|---|---|
| 2003/0099219 A1* | 5/2003 | Abrol et al. | 370/338 |
| 2003/0115266 A1 | 6/2003 | Sweet et al. | |
| 2004/0090937 A1* | 5/2004 | Chaskar et al. | 370/331 |
| 2004/0114553 A1 | 6/2004 | Jiang et al. | |
| 2005/0128956 A1* | 6/2005 | Hsu et al. | 370/252 |
| 2006/0095962 A1 | 5/2006 | Lioy et al. | |
| 2008/0095084 A1 | 4/2008 | Nakahara et al. | |

FOREIGN PATENT DOCUMENTS

| | | |
|---|---|---|
| JP | 2001086156 | 3/2001 |
| JP | 2002501331 | 1/2002 |
| JP | 2002291011 A | 10/2002 |
| JP | 2004201087 | 7/2004 |
| JP | 2005244388 | 9/2005 |
| JP | 200619934 | 1/2006 |
| KR | 2001-0001928 | 1/2001 |
| KR | 20030037894 | 5/2003 |
| KR | 2003-0050897 | 6/2003 |
| KR | 2003-0082570 | 10/2003 |
| RU | 2073913 | 2/1997 |
| RU | 2215376 | 10/2003 |
| WO | WO9205556 | 4/1992 |
| WO | WO 9933307 A1 * | 7/1999 |
| WO | WO9935798 | 7/1999 |
| WO | WO02058358 A2 | 7/2002 |
| WO | 03065682 | 8/2003 |
| WO | WO03079716 | 9/2003 |
| WO | WO2004045224 | 5/2004 |
| WO | WO2005092501 | 10/2005 |

OTHER PUBLICATIONS

Simpson, W. "The Point to Point Protocol (PPP) RFC 1661", *IETF*, Jul. 1994; XP002250097; pp. 1-50.
Simpson, Daydreamer W, PPP Vendor Extensions; rfc2153.txt *IETF Standard Internet Engineering Task Force, IETF, CH*, May 1997; XP015007937 pp. 1-4.
International Search Report—PCT/US2005/035284, International Search Authority—European Patent Office—Apr. 12, 2006.
International Preliminary Report Patentability—PCT/US2005/035284, International Search Authority—The International Bureau of WIPO—Apr. 3, 2007.
Written Opinion—PCT/US2005/035284, International Search Authority—European Patent Office—Mar. 28, 2007.
RFC 1662; Simpson, W. "PPP in HDLC-like Framing" IETF, pp. 1-23 (Jul. 1994).
3GPP2 A.S0011-C, Version 1.0: "Interoperability Specification (IOS) for CDMA 2000 Access Network Interfaces," TIA-2001-D (Feb. 2005).
Taiwan Search Report—TW094133760-TIPO—Aug. 17, 2011.
Alexander, S. et al. "DHCP Options and BOOTP Vendor Extensions," IETF Standard, RFC 1533, Internet Engineering Task Force, IETF, CH (Oct. 1993) XP015007320.
Droms, R.: "Dynamic Host Configuration Protocol," IETF Standard, RFC 2131, Internet Engineering Task Force, IETF, CH, pp. 1-45, (Mar. 1997) XP015007915.
Information Science Institute: "Internet Protocol, DARPA Internet Program Protocol Specification," RFC 791, The Internet Engineering Task Force (IETF) Request for Comments, pp. 1-49, Sep. 1981.
Simpson, (1994) The point-to-point protocol (PPP). RFC 2131, Network Working Group, XP-002150336.

* cited by examiner

HANDOFF SUPPORTS FOR NETWORKS HAVING DIFFERENT LINK ESTABLISHMENT PROTOCOLS

CLAIM OF PRIORITY UNDER 35 U.S.C §119

The present Application for Patent claims priority to U.S. Provisional Application No. 60/614,215, entitled "A Method and Apparatus for Handoff Support Fast Link Establishment Protocol," filed on Sep. 28, 2004, and assigned to the assignee hereof and expressly incorporated by reference herein.

BACKGROUND

I. Field

The present invention generally relates to packet data communications, and more particularly, to handoff supports for networks with different link establishment protocols which executions are often required prior to any packet data communications among networks.

II. Background

Interconnecting of networks globally allows information to be swiftly accessed irrespective of geographical distances. FIG. 1 shows a simplified schematic drawing of the global connection of networks, commonly referred to as the Internet signified by the reference numeral 20. The Internet 20 is in essence many networks with different levels of hierarchy linked together. The Internet 20 is operated under the IP (Internet Protocol) promulgated by the IETF (Internet Engineering Task Force). Details of the IP can be found in RFC (Request For Comments) 791 published by the IETF.

Connected to the Internet 20 are various individual networks, sometimes called LANs (Local Area Networks) or WANs (Wide Area Networks) depending on the network sizes. Shown in FIG. 1 are some of such networks 22, 24, 26 and 28.

Within each of the networks 22, 24, 26 and 28, there can be various pieces of equipment connected to and in communication with each other. Examples are computers, printers, and servers, to name just a few, which are commonly called nodes. When a node communicates beyond its own network via the Internet 20, an IP address needs to be assigned to the node. The assignment of the IP address can be manual or automatic. The manual assignment of the IP address can be performed by a network administrator, for example. More often, the IP address is automatically assigned, for instance, by a dedicated server in the LAN or WAN.

Take an example for illustration. Suppose a node 30 in the network 22 attempts to send a data packet to another node 37 in the network 24. Under the IP, each data packet needs to have a source address and a destination address. In this case, the source address is the address of the node 30 in the network 22. The destination address is the address of the node 37 in the network 24.

Oftentimes, node-to-node communications are required prior to network access, such as accessing other networks via the Internet 20. Take yet another example for illustration. Suppose the node 30 in the network 22 is a laptop computer. The laptop computer node 30 does not have direct access to the network 22. Nevertheless, the laptop computer node 30 may reach a NAS (Network Access Server) 32 in the network 22 via some other means, such as by dialing up a wired modem through a telephone line, for example. In that case, the node 30 typically establishes a PPP (Point-to-Point Protocol) session with the NAS (Network Access Server) 32 in the network 22. Packet data communications thereafter established between the node 30 and the network 22, or any other networks via the Internet 20, will be exchanged through the wired modem and the telephone line. If the modem transmits and receives signals serially and asynchronously through the telephone line, data packets exchanged over the telephone line also have to be framed accordingly to suit the serial and asynchronous modem link.

Advances in wireless technologies allow nodes to move away from their originally registered network to another network. For instance, referring back to FIG. 1, the node 30, instead of permanently wired to the network 22, can be a wireless device, such as a PDA (Personal Device Assistant), a cellular phone, or a mobile computer. The wireless node 30 can travel beyond the boundary of its home network 22. Thus, the node 30 may roam away from its home network 22 to a foreign network 28. To gain access of the network 28, or to be connected to other networks via the Internet 20, the node 30 also typically establishes a PPP session with a NAS 33 in the network 28. Communications between the node 30 and the NAS 33 in this case are through the air link. Again, data packets exchanged over the air link also have to be framed to fit into the format which is negotiated during the PPP session between the node 30 and the NAS 33.

The bulk of the PPP is described in RFCs 1661 and 1662 published by the IETF. The PPP is in essence an exploratory and negotiating session between nodes, during which session, the nodes find out from each other's resources in terms of capability and availability and finally converge to a set of mutually acceptable parameter options, prior to any network traffic flow. Because a PPP session often needs to be established prior to network access, the PPP is sometimes called a "network interface layer protocol." However, other similar terms are also commonly used, including "link establishment protocol" and "Layer-2 protocol." Hereinbelow, the terms "network interface layer protocol," "link establishment protocol" and "Layer-2 protocol" are used interchangeably.

FIG. 2 shows a sequence flow diagram of an exemplary PPP communication session 34 in which the node 30 in the network 28 seeks to establish a communication link with the NAS 33 for gaining access to the Internet 20.

The PPP has a number of protocol components. In the exemplary PPP session shown in FIG. 2, the PPP has the LCP (Link Control Protocol) 36, CHAP (Challenge/Handshake Authentication Protocol) 38, and IPCP (Internet Protocol Configuration Protocol) 40 as components.

First, upon completion of the physical link, that is, the node 30 and the NAS 33 are capable of reaching each other at the hardware level, for example, there is a need to go through the LCP 36. The LCP 36 serves the purpose of establishing the basic communication link between the node 30 and the NAS 33. During the LCP 36, the node 30 and the NAS 33 exchange and negotiate essential communication parameter options with each other. The options can include, maximum size of the data packet through the link, parameters relating to quality control, HDLC (High Level Data Link Control) header field compression scheme used, and whether the peer is willing to be authenticated.

The processes for the LCP 36 are more or less operated under a handshake etiquette. First, the requesting party proposes one or more parameters by sending a Configure Request message. If any parameter is not recognized by the receiving party, the receiving party responds back with a Configure Reject message. If the rejected parameter is fatal to the sought link, the requesting party then has to terminate the PPP session.

On the other hand, if the parameter is recognized but the option related to the parameter is not acceptable, the responding party sends back a Configure Nak message. The requesting party again can either terminate the PPP session or send another Configure Request message with a different option for the same parameter.

All parameters with the associated options have to be negotiated and settled in manner as described above. Several rounds of negotiation may be required, as shown in FIG. 2. If the requesting party determines that all the parameters needed are acceptable to the responding party, the requesting party sends a final Configure Ack message to the responding party. Once both parties have sent Configure Ack messages, they then transition to the authentication phase.

To ensure the parties are authorized, authentication has to be carried out. One way to perform authentication is to use the other PPP component CHAP 38. It is typically the NAS 33 that initiates the CHAP 38 to verify the identity of the node 30. During the CHAP 38, the NAS 33 sends a message called a challenge message to the node 30. Under the CHAP, there is a shared secret which is used along with the challenge message that is used to calculate a response message using a pre-agreed upon algorithm. The node 30 then sends the response message generated by the secret algorithm to the NAS 33. The NAS 33 thereafter compares the received response message with the message calculated by the NAS 33 itself. If there is a comparison match, the node 30 is said to pass the CHAP 38 in which the NAS 33 sends a CHAP Success message to the node 30. Otherwise, a CHAP Failure message is sent by the NAS 33.

Alternatively, instead of the CHAP 38, authentication can be accomplished by going through a PAP (Password Authentication Protocol). In the PAP, the node 30 merely sends the NAS 33 a username and password for verification. If verified, the node 30 is said to pass the PAP.

If the node 30 needs IP access, information relating to IP again needs to be exchanged and negotiated. For example, among other things, the node 30 may need to have an assignment of an IP address in order to access the Internet 20 (FIG. 1) in accordance with the IP. To accomplish this end, negotiation and exchange of parameter options under the IPCP 40 commence. In the exemplary PPP session 34, the node 30 initially requests an IP address 0.0.0.0 from the NAS 33. In response, the NAS 33 sends a Configure Nak message, suggesting the node 30 uses the IP address a.b.c.d. If accepted, the node 30 confirms the use of the IP address a.b.c.d by sending the NAS 33 another message for acknowledgement.

Finally, when the node 30 agrees to all the parameters negotiated during the IPCP 40, the node 30 sends an acknowledge message to the NAS 33. User data of the network access session are thereafter exchanged. The IP data packets of the network traffic are encapsulated into the PPP frames with parameters negotiated during the LCP 36 earlier.

At the end of the network access, either the node 30 or the NAS 33 may send a Terminate Request message to the other, which thereafter responds back with a Terminate Ack message and conclude the communication session.

As can be seen in FIG. 2 and described above, there are quite a number of messages exchanged between the node 30 and the NAS 33 during the PPP session 34. As such, considerable time duration is involved. This is especially true if the PPP session 34 is negotiated over a slow link with high data latency.

To expedite the initial link establish process between the node 30 and the NAS 33, various protocols other than the PPP have been proposed. An example of such protocols is taught in U.S. patent application Ser. No. 11/193,068, entitled "Fast Link Establishment for Network Access," filed on Jul. 28, 2005 (hereinafter, the "'068" patent application). The '068 patent application which is assigned to the assignee hereof is hereby expressly incorporated by reference herein in its entirety. Hereinbelow, any link establishment protocol other than the PPP is called a non-PPP.

However, problems arise in a communication system in which some networks support non-PPPs while others do not. The problems can further be compounded when mobile nodes roam around the different networks with different link establishment protocols.

Take another example for illustration. Reference is now directed back to FIG. 1. Suppose the node 30, after migrating to the network 28, establishes a communication link with the NAS 33 via a non-PPP session. User data is thereafter exchanged between the node 30 and the NAS 33. Further suppose that in the midst of exchanging user data, the node 30 moves to yet another network, such as the network 26. If the network 26 is similar to the network 28 is every aspect regarding physical and protocol implementations, including the network interface layer protocol implementation, a streamline handoff scheme can be devised. After reaching the territory of the network 26, the network 28 can hand over the data processing duties to the network 26 which can then take over the packet data communications functions previously held by the network 28.

However, the networks 28 and 26 are often not similar in hardware and link layer implementation. For example, suppose the network 28 supports not only the PPP but also another non-PPP as the network interface layer protocols. On the other hand, the network 26 supports only the PPP as the network interface layer protocol but no others. After migrating to the network 26 from the network 28 and to continue with network access, the node 30 needs first to establish another network interface layer protocol session with the NAS 35 in the network 26, such that packet data communications established thereafter conform to the physical link established between the node 30 and the NAS 35 in the network 26. If the node 30 is not adapted to smoothly invoke the conventional PPP required by the network 26, the node 30 can be totally cut out of network access.

Accordingly, there is a need to provide reliable handoff processes for migrating nodes seeking network accesses among different networks supporting different network interface layer protocols.

SUMMARY

In a communication system with a plurality of networks, a node seeking network access in the communication system needs to go through a handoff process migrating from one network to another. Special challenges arise when the different networks are implemented with different network interface layer protocols. In accordance with an exemplary embodiment of the invention, handoff schemes and are instituted whereby the node may roam from one network to another with less interruptions with respect to network access. Prior to a handoff, the node receives an indication for handoff. The indication may assume the form of a change of SID (System Identification), NID (Network Identification), or PZID (Packet Zone Identification), or combination thereof. Alternatively, the indication can be straightforwardly included in a data packet sent to the node during handoff. As a further alternative, the indication can be in the form of message patterns sent to the node in which different message patterns are sent by different networks supporting different network interface layer protocols.

In accordance with one aspect of the invention, disclosed is a method in which the node seeking network access goes through the method which includes the steps of establishing a first network interface layer protocol with a serving node, receiving an indication for a handoff, and establishing a second network interface layer protocol with a target node.

In accordance with another aspect of the invention, disclosed is an apparatus having hardware implementation for executing the steps of the above-mentioned disclosed method.

In accordance with yet another aspect of the invention, disclosed is a computer-readable medium having computer-readable instructions for executing the steps of the above-mentioned disclosed method.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Figure 3:
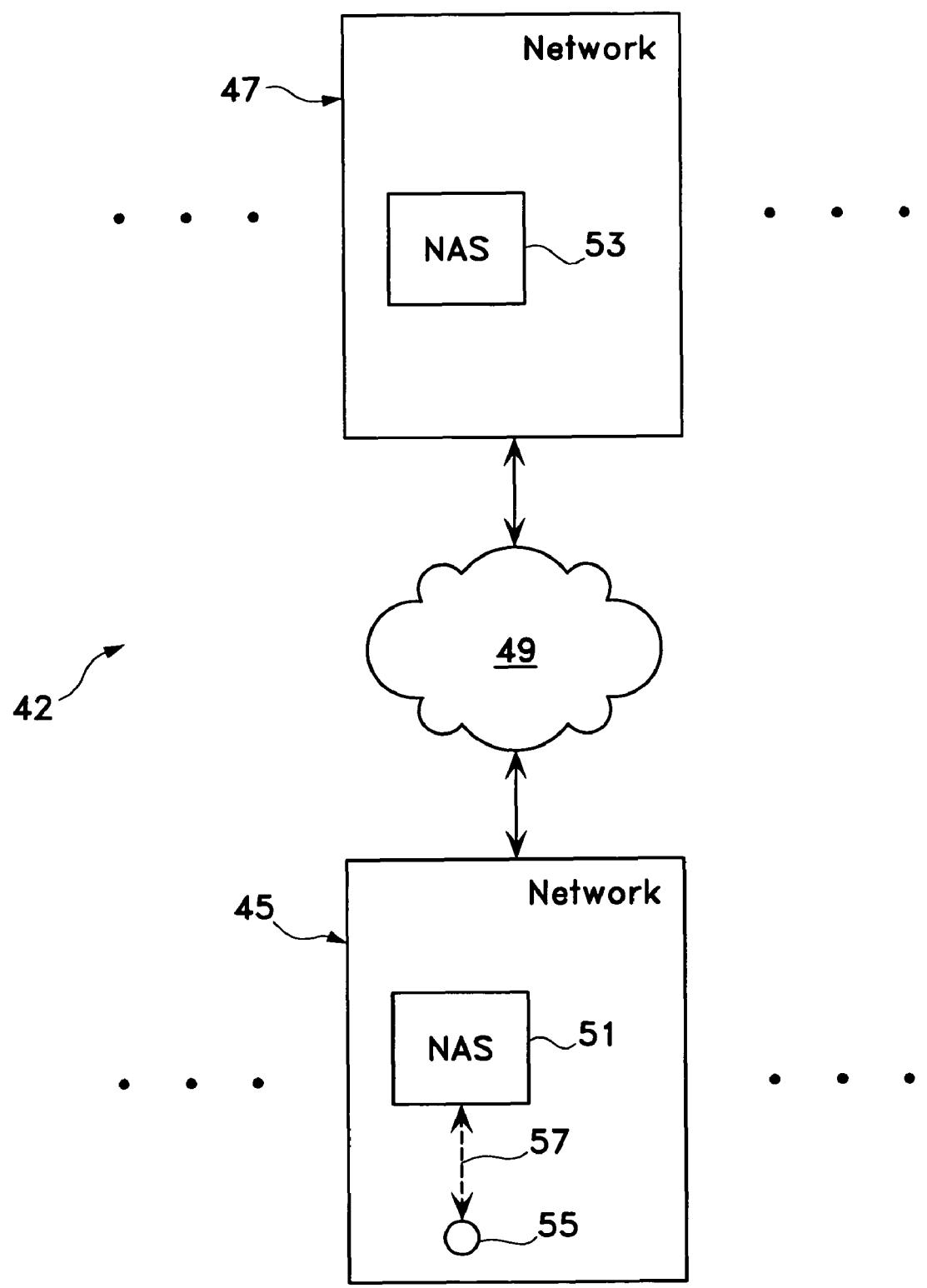
FIG. 3 is a schematic drawing of the nodes and networks involved in a general embodiment of the invention.

FIG. 3 shows a simplified schematic drawing of the nodes and networks involved in a general embodiment of the invention. The communication system is overall signified by the reference numeral 42, which includes networks 45 and 47 connected to a backbone network 49. The backbone network 49 can be an intranet or the Internet. There can be other networks connected to the backbone network 49 but are not shown in FIG. 3 for reasons of clarity and conciseness.

Disposed in the networks 45 and 47 are respectively NASs (Network Access Servers) 51 and 53, which in turn serve as gateways for any nodes that seek network access. Suppose in the system 42, there is such a node 55 that looks for access of either the network 45 or other networks via the backbone network 49. The node 55 has no direct access to the network 45 but can communicate with the NAS 51 through a communication link 57. The setting up of communications between the node 55 and the NAS 51 is via a process called "link establishment."

Suppose the node 55 is not confined at its original network, such as the network 45, but is capable of relocating to other networks, such as the network 47.

In this case, when the node 55 leaves the network 45 and moves to the network 47, to gain network access, the node 55 likewise has to establish another link establishment session with the NAS 53 in the network 47 via yet another communication link.

The link 57 between the NAS 51 and the node 55 can be a link which assumes various forms. For example, the link 57 can be a wire link, such as a conventional telephone wire connection, a coaxial cable link, or an optical cable link, to name just a few. Furthermore, the link 57 can also be a wireless link, such as the air interface capable of carrying electromagnetic or acoustic signals, for instance.

Figure 4:
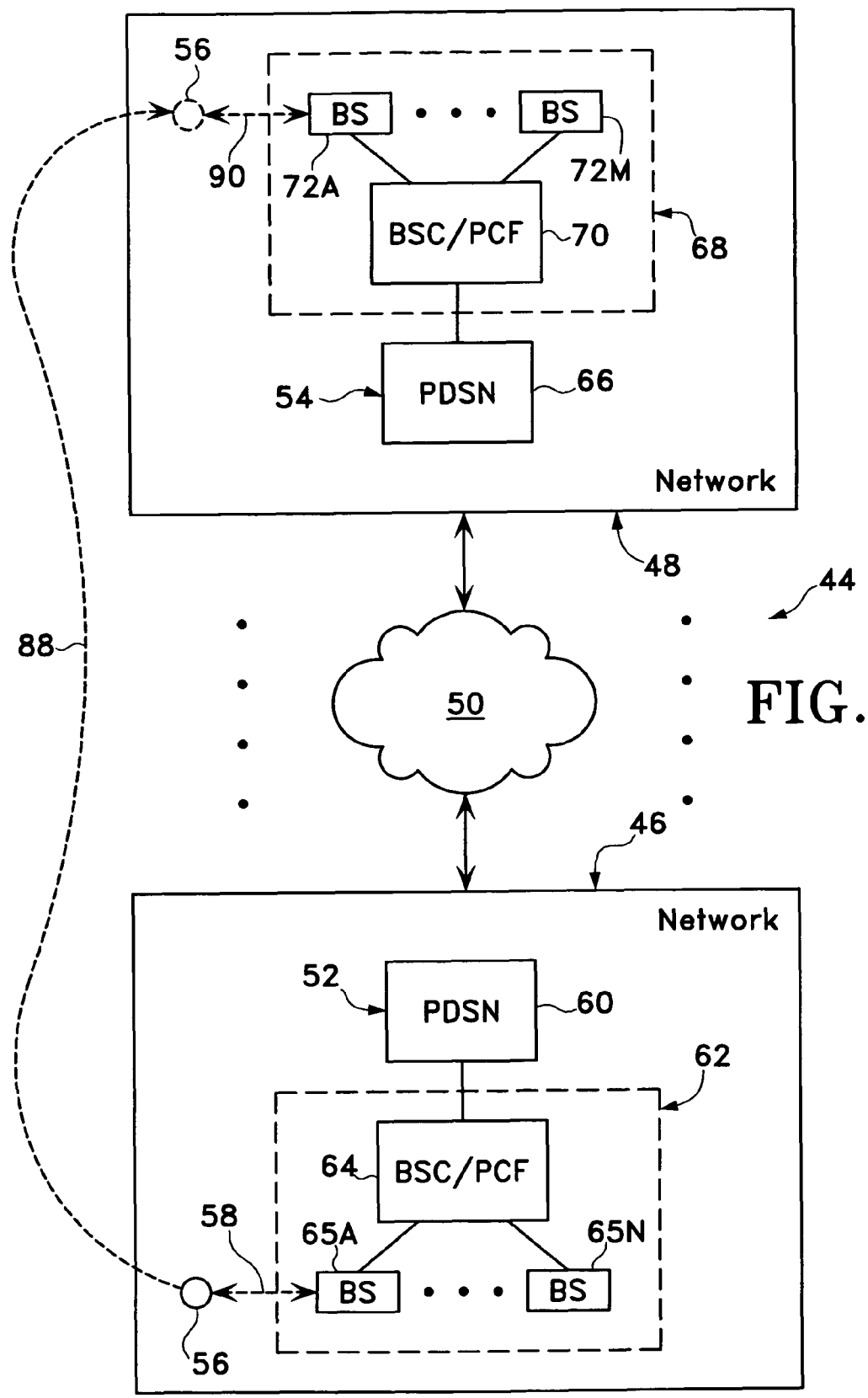
FIG. 4 is a schematic drawing of the nodes and networks involved in an exemplary embodiment of the invention which supports wireless technologies.

FIG. 4 shows a more specific implementation of the communication system 42 which supports wireless technologies. In this case, the overall system is generally signified by the reference numeral 44. Wireless communications among nodes may be carried via links in the form of air interface, such as the air interface links 58 and 90 shown in FIG. 4. In this embodiment, for purposes of consistence and clarity in explanation, the network 44 is depicted as supporting wireless technologies such as the cdma2000 standards as set forth by the 3GPP2 (Third Generation Partnership Project 2), which is a consortium of several international standards bodies, including the TIA/EIA (Telecommunications Industry Associations/Electronic Industries Associations) of the United States.

In the system 44, the node 56 which is capable of roaming to other networks can be embodied in various forms, such as a PDA (Personal Digital Assistant), a mobile computer, or a cellular telephone, to name just a few.

In the networks 46, there is implemented a PDSN (Packet Data Serving Nodes) 60 which serves the function of a NAS 52. The node 58 communicates with the PDSN 60 through a RAN (Radio Access Network) which is generally denoted by the reference numeral 62. The RAN 62 includes a BSC/PCF (Base Station Controller/Packet Data Control Function) 64 connected to a plurality of BSs (Base Stations) 65A-65N.

Likewise, in the network 48, there is disposed another PDSN (Packet Data Serving Nodes) 66 which assumes the duty of another NAS 54. Any node that seeks network access communicates with the PDSN 66 through another RAN 68. The RAN 68 includes a BSC/PCF 70 connected to a plurality of BSs 72A-72M.

The networks 46 and 48 are capable of processing data packets carrying voice or data information. Architectural details of the wireless-capable networks 46 and 48 can be found in a document published by the 3GPP2, entitled "Interoperability Specification (IOS) for CDMA 2000 Access Network Interfaces," TIA-2001-D, February 2005.

Prior to describing the operational details of the communication system 42, it helps first to explain generally the processing of a data packet during packet data communications of via the various levels of protocols of different hierarchies and their mutual relationships.

In the art of network communications, protocols are hierarchized in accordance with the OSI (Open System Interconnection) model, as set forth by the ISO (International Organization for Standardization) and the ITU-T (International Telecommunication Union-Telecommunications Standards Sector). The purpose is to facilitate multi-vendor equipment interoperability. That is, each level of protocol hierarchy has its own specifications. As such, as long as the specifications of a particular hierarchy level are met, developments of products in that level are assured to be compatible with other products in other levels.

Figure 5:
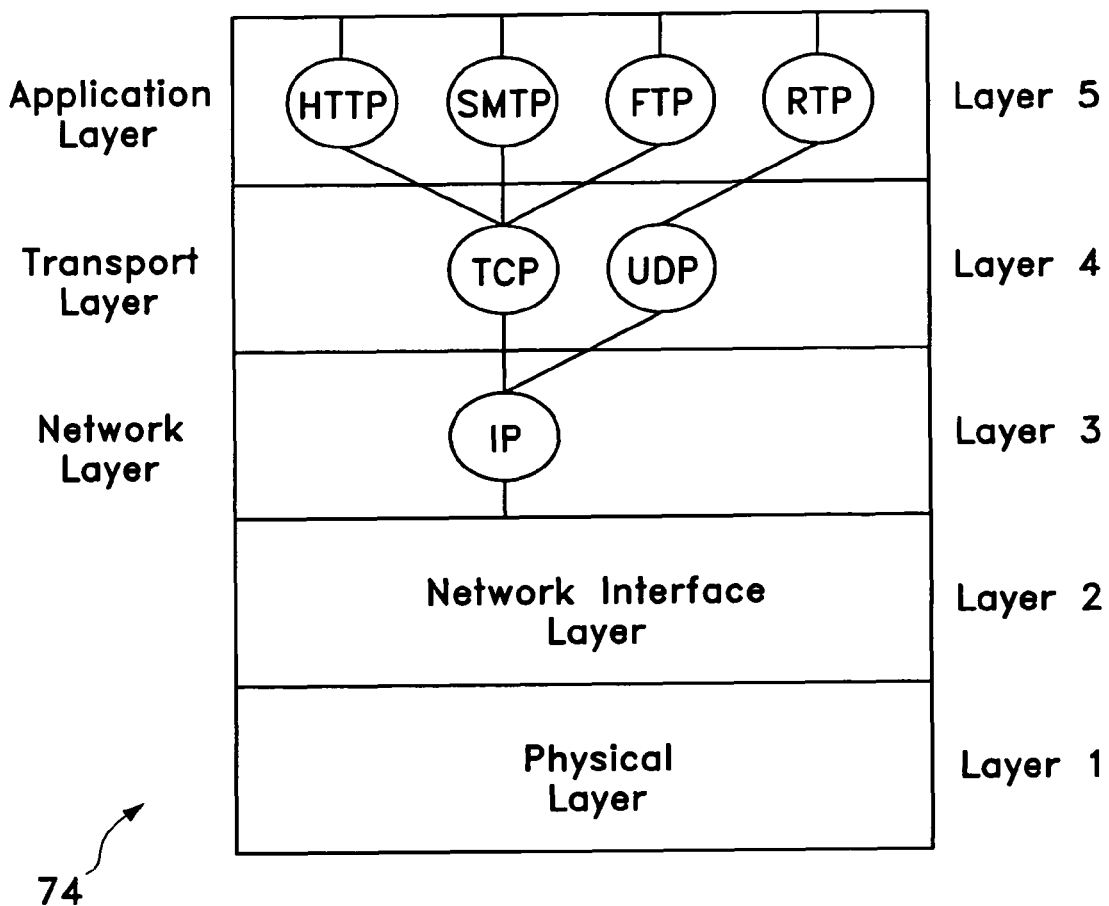
FIG. 5 is a schematic drawing showing a stack of protocols in hierarchical order.

Suppose the system 44 in FIG. 4 supports the IP (Internet Protocol). FIG. 5 schematically shows a stack of protocols in hierarchical order, commonly referred to as the "protocol stack," and is generally signified by the reference numeral 74. The IP protocol stack 74 is structured in conformance with the IETF (Internet Engineering Task Force) model which is similar to but not exactly the same as the OSI model. In accordance with the IETF model, the IP protocol stack 74 has five layers, starting from Layer 1 to Layer 5. Thus, a data packet sent out by a node, such as each of the nodes 56, 60 and 66 as shown in FIG. 4, has to be processed through the protocol stack 74. The stack of protocols 74 is built in the node in the form of software or hardware, or combination thereof. Likewise, a data packet received by the same node has to be processed through the same protocol stack 74 but in the reverse order.

Take an example for illustration. Suppose a data packet is processed to be sent out from a node, for instance the node 56 (FIG. 4), the data packet is first created in accordance with one of the protocols in the application layer, i.e., Layer 5. Layer 5 includes the HTTP (Hyper Text Transfer Protocol), SMTP (Service Mail Transfer Protocol), FTP (File Transfer Protocol) and the RTP (Real Time Transfer Protocol). Further suppose the data packet is a product of a VoIP (Voice over Internet Protocol) session. The data packet thus has to be formatted in accordance with the RTP in Layer 5.

Time sensitive data packets, such as the data packet resulted from the RTP in Layer 5, need to be processed in real time. Specifically, defective packets are not normally resent but instead simply dropped so as not to obstruct transmissions of other oncoming data packets. RTP data packets are therefore normally carried via the UDP (User Data packet Protocol) in Layer 4, the transport layer. Accordingly, the data packet from the RTP in Layer 5 has further to be formulated in accordance with the UDP in Layer 4.

On the other hand, if the data packet originates from other protocols in the Layer 5, such as the FTP, the data packet is normally sent via the TCP (Transport Control Protocol) in Layer 4. Under the TCP, accurate delivery of the data packet is of prime importance. As such, defective packets are always resent, albeit possibly slowing down the overall data transmission process.

Data packets after passing through this transport layer, Layer 4, are added with information such as the source and destination port numbers.

The data packet after going through the transport layer, Layer 4, is then sent to the network layer, Layer 3, for processing. In this particular case, the resultant data packet from Layer 4 has to be formatted again in accordance with the IP, for instance, with the source and destination addresses of the data packet added.

It should be noted that for reason of brevity, only the IP in Layer 3 is shown in FIG. 5. There are other protocols which perform supplemental functions to the IP also existent in Layer 3. An example is the ICMP (Internet Control Message Protocol) which serves the purpose of sending error messages for undeliverable data packets.

Thereafter, the data packet has to be framed to fit into whatever protocol is applicable in the link layer, Layer 2. The PPP (Point-to-Point Protocol) described previously is classified as a Layer 2 protocol. As mentioned earlier, there are other non-PPPs used by networks replacing the PPP as the network interface layer protocol.

The bottom-most layer of the protocol stack 74 in FIG. 5 is the physical layer, Layer 1, which deals with the physical implementation of the transmission for the data packet. For example, in FIG. 3, if the communication link 57 is a conventional wire link, the physical layer, Layer 1, concerns with hardware circuitry on both the nodes 55 and 51 driving signals though the conductive wires which make up the link 57. As another example, in FIG. 4, the communication link 58 is the air interface, the physical layer, Layer 1, relates to the air space and the hardware circuitry of the RAN 62 transceiving signals via the air space.

Reference is now returned to FIG. 4. As for a data packet received by the exemplary node 56, the data packet has to be processed through the same protocol stack 72 (FIG. 5) but in the reverse order, that is, from Layer 1 to Layer 5.

Suppose in this example, the node 56 initially seeks network access via the PDSN 60. Further suppose the node 56 has no direct access to the network 46.

Conventionally, the node 56 may start the network access process by first establishing a PPP session with the PDSN 60. However, as previously explained, to streamline the linking process prior to network access, other network interface layer protocols have been proposed. One of such protocols is taught in the '068 patent application, as also mentioned earlier.

In the following description, for ease of explanation, the protocol disclosed in the '068 patent application is depicted in conjunction with the operational description of the exemplary embodiment. However, it should be noted that practice of the invention need not and should not be so restricted. Other network interface layer protocols other than the protocol described in the '068 patent application are surely applicable.

Returning to FIG. 4, prior to any exchange of messages, the physical link 58 must be ready to carry signals. Phrased differently, the physical layer, Layer 1, of the node 56 and the BS 65A must first be physically present and established.

Once the physical layer is established, that is, both the node 56 and the PDSN 60 detect the mutual physical presence of each other via the RAN 62, the PDSN 60 immediately sends out a first message to the node 56.

Figure 6:
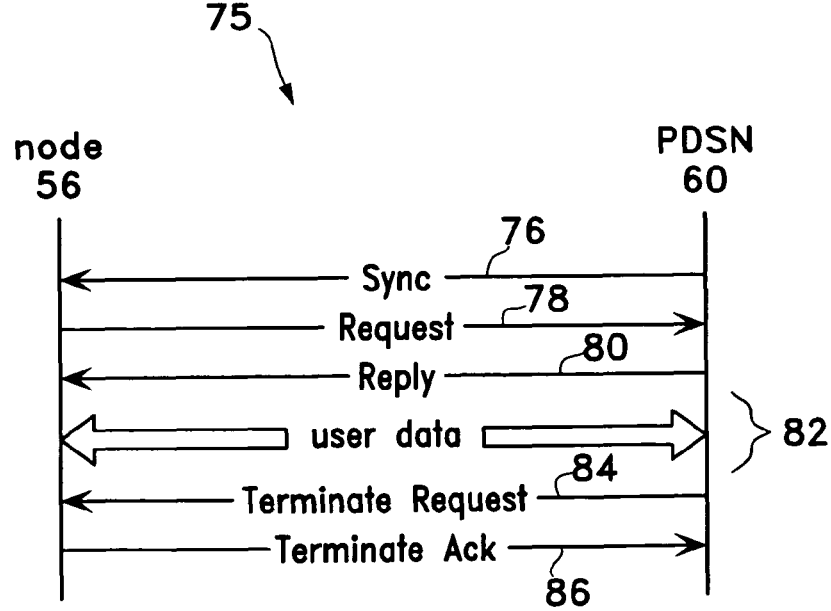
FIG. 6 is a communication sequence diagram of a communication session of an exemplary network interface layer protocol different from the conventional network interface layer protocol shown in FIG. 2.

FIG. 6 is a flow diagram showing the communication sequence of messages between the node 56 and the PDSN 60.

The overall flow process is designated by the reference numeral 75. The flow process 75 is described in details in the '068 application but is briefly summarized below.

The PDSN 60 only accepts network accesses of nodes that are authorized. The first message is sent out by the PDSN 60 and is called a Sync message which is signified by the reference numeral 76. The Sync message 76 includes all possible authentication options for the node 56 to select from. The options may comprise a challenge message under the CHAP (Challenge Authentication Protocol), and a request for password and username required by the PAP (Password Authentication Protocol), and any other authentication protocols that are applicable.

Upon receipt of the Sync message 76, the node 56 responds with a Request message 78, as shown in FIG. 6.

In the Request message 78, the node 56 includes necessary authentication information in response to the requests as set forth in the Sync message 76. In addition, the node 56 also includes in the Request message 78 all parameter options needed for establishing the link for the node 56 for subsequent network access via the PDSN 60. It makes no difference whether the parameters with the associated options are related to link configuration, authentication, or network access control. That is, instead of classifying the parameters according to the functions of the protocol components such as the LCP (Link Control Protocol), CHAP (Challenge Handshake Authentication Protocol) and IPCP (Internet Protocol Control Protocol) as described previously with respect to the PPP, in the Request message 78, all parameters with the options are included irrespective of functions. More specifically, the parameters with the options in the Request message 78 can include a response to the challenge message, or user name and password if applicable, link configuration parameters of the link 58 such as the datagram size and HDLC (High Level Data Link Control) header field compression scheme, as well as parameters for network access such as an IP address, DNS (Domain Name System) configuration, and IP header compression protocol if applicable, and so forth.

The Request message 78 basically is formatted with intentional redundancy in terms of choices so as to allow the PDSN 60 to select the options that are supported by both nodes 56 and 60, thereby allowing both nodes 56 and 60 to conclude the overall process of the Layer 2 link expeditiously. Out of the variety of choices, the PDSN 60 may selectively choose the parameters with the associated options that are clearly supported for the purpose of increasing the chance of a successful link, thereby curtailing the overall link time.

In response to the Request message 78, as shown in FIG. 6, the PDSN 60 sends a Reply message 80. In the Reply message 80, the PDSN 60 selects options out of the various choices. The Reply message 80 includes the selected parameter options with their associated configuration values. Very often, the Reply message 80 is the last message needed prior to the commencement of network traffic in the form of user data 82 by the node 56. At the end of the network access, either the node 56 or the PDSN 60 may send a Terminate Request message 84 to the other, which thereafter responds back with a Terminate Acknowledge message 86 and conclude the communication session.

As can be seen, unlike other protocols such as the PPP protocol described previously, the link process 75 involves substantially less number of message exchanges prior to the commencement of user data 82. Accordingly, link establishment of the link layer, i.e., the Layer 2, can thereby be more quickly accomplished.

Suppose in this example, in the midst of exchanging user data 82 with the PDSN 60 in the network 46, the node 56 starts to migrate to another network, such as the network 48. The path of migration is denoted by the reference numeral 88 as shown in FIG. 4.

Under this scenario, the node 56 basically goes through a process commonly called a "handoff." More particularly, the node 56 switches the communicating party from the PDSN 60 through the RAN 62 in the network 46 to the PDSN 66 through the RAN 68 in the network 48. In accordance with this embodiment, prior to handoff, the node 56 first needs to receive an indication for the handoff. The indications for the handoff can be manifested in various forms implemented in different schemes.

Figure 7:
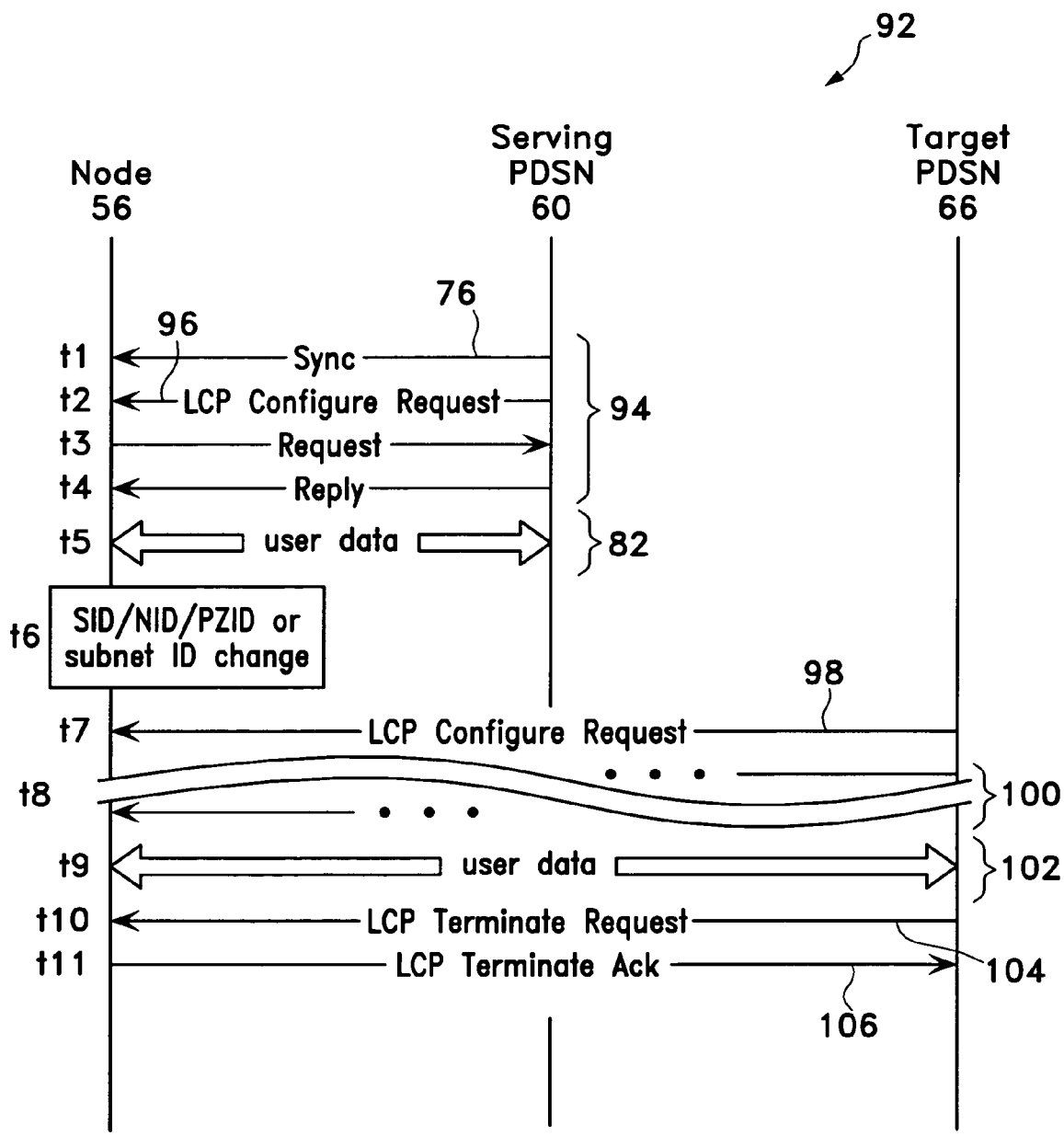
FIG. 7 is a communication sequence diagram showing the steps involved in accordance with a first handoff scheme used in the exemplary embodiment of the invention.

FIG. 7 shows one such scheme generally signified by the reference numeral 92. Reference is now made to FIG. 7 in conjunction with FIG. 4.

Prior to handoff, suppose the node 56 first undergoes a non-PPP link session 94 with the PDSN 60 via the RAN 62 prior to any network access. The session 94 can be the link establishment process 75 as shown and described in FIG. 6. The non-PPP link establishment session 94 lasts from the time periods t1-t4, for instance.

It should be noted that in the middle of the non-PPP link session at the time period t2, the PDSN 60 sends out a LCP Configure Request message 96 which is a PPP message. The reason is the PDSN 60 initially has no knowledge of whether the node 56 supports the conventional PPP or the non-PPP. To increase the chance of linking the node 56, both the Sync message 76 in accordance with link establishment process 75 (FIG. 6) and the LCP Configure Request message 96 under the PPP are sent out. In this case, the node 56 supports the link establishment process 75. As such, the network interface layer protocol session 94 is executed in accordance with the link establishment process 75.

After the network interface layer protocol session 94 is established successfully, user data 82 can thereafter be exchanged at the time period t5. Suppose at this point in time, the node 56 starts to move away from the network 46 toward the network 48.

In accordance with the cdma2000 standards, wireless-capable networks, such as the networks 46 and 48, constantly broadcast messages to identify their identities. The broadcast message can be in the form of a "System Parameter Message," and sometimes an "Extended System Parameter Message" carried over a F-BCCH (Forward Broadcast Control Channel) which is one of the forward control channels of the network. As such, a node, such as the node 56, can always find out its whereabouts by detecting the broadcast messages from the networks.

In the System Parameter Message, among other things, a SID (System Identification) and a NID (Network Identification) can be found. The SID is a number which is assigned to a particular wireless operator of a network, such as the network 46 or 48. On the other hand, the NID is number which uniquely identifies a particular network within a communication system, such as the system 44.

In the Extended System Parameter Message, it includes a PZID (Packet Zone Identification) which identifies the area of coverage of a PCF, such as the BSC/PCF 64 or 70 shown in FIG. 4. If the communication system, such as the system 44, supports HRPD (High Rate Packet Data), commonly known as 1xEV-DO, which is a CDMA (Code Division Multiple Access)—based wireless data technology, a Subnet ID (Identification) instead of a PZID can be found from the Subnet Mask and Sector ID in another broadcast message called a "Sector Parameter Message."

Returning now to FIGS. 4 and 7, suppose when the node 56 reaches the territory of the network 48, the node 56 receives a broadcast message from the network 48. From the broadcast message, among other things, a new NID is shown. The new NID is different from the previous counterpart. With the change in NID, the node 56 knows that it has moved to another network. Suppose in this instance, the network 48 does not support any non-PPP as its Layer 2 protocol. As such, the PDSN 66 in the network 48 sends out a LCP Configure Request message 98. The node 56 responds to the LCP Configure Request message 98 this time. The reason is the node 56 can reasonably assume of its entry to a new network because of the change of NID, yet no non-PPP message such as the Sync message 76 is received. Instead, a LCP Configure Request message 98 which is a PPP message is received. The node 56 immediately knows that the newly arrived network, such as the network 48, does not support any non-conventional Layer 2 protocol. The node 56 thereby swiftly orients itself to negotiate with the PDSN 66 via a PPP negotiation session 100 at the time period t8. If successful, user data 102 are thereafter exchanged at time t9, as shown in FIG. 7.

It should be noted that the node 56 responds to the LCP Configure Request message 98 from the network 48 at the time period t7 but not the LCP Configure Request message 96 from the network 46 at the time period t2. As mentioned earlier, it is because the node 56 has knowledge of the change of SID, NID or PZID at the time period t6 prior to the time period t7.

After successful executing the PPP negotiation session 100, user data 102 can then be established. At the end of user data 102, either the node 30 or the NAS 33 may send a Terminate Request message 104 to the other, which thereafter responds back with a Terminate Ack message 106 at the time periods t10 and t11, respectively, and conclude the communication session 92.

Figure 8:
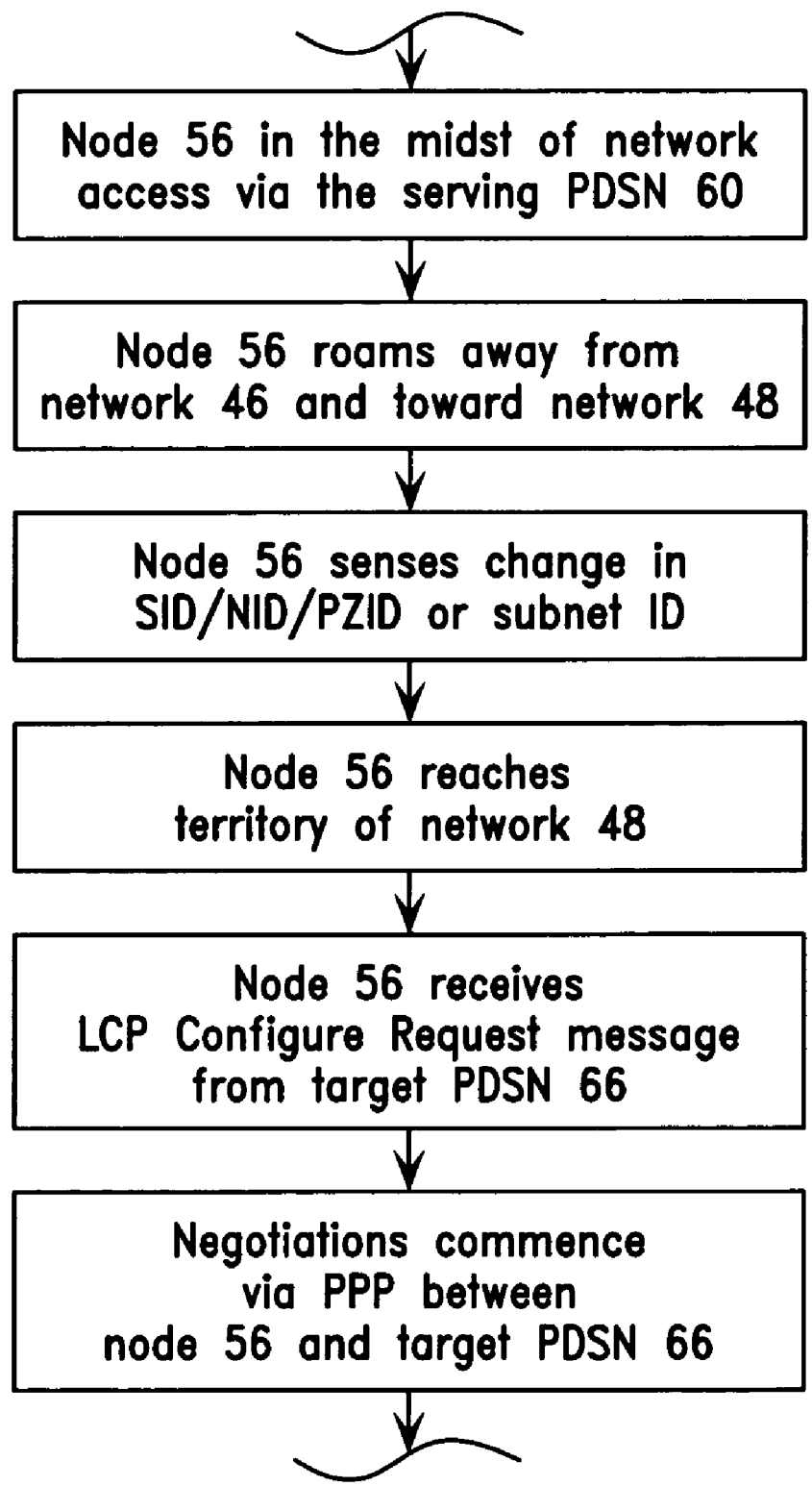
FIG. 8 is a flowchart of the handoff scheme of the communication sequence diagram shown in FIG. 7.

Relevant steps of the first handoff scheme in accordance with this embodiment are shown in the flowchart of FIG. 8.

Figure 9:
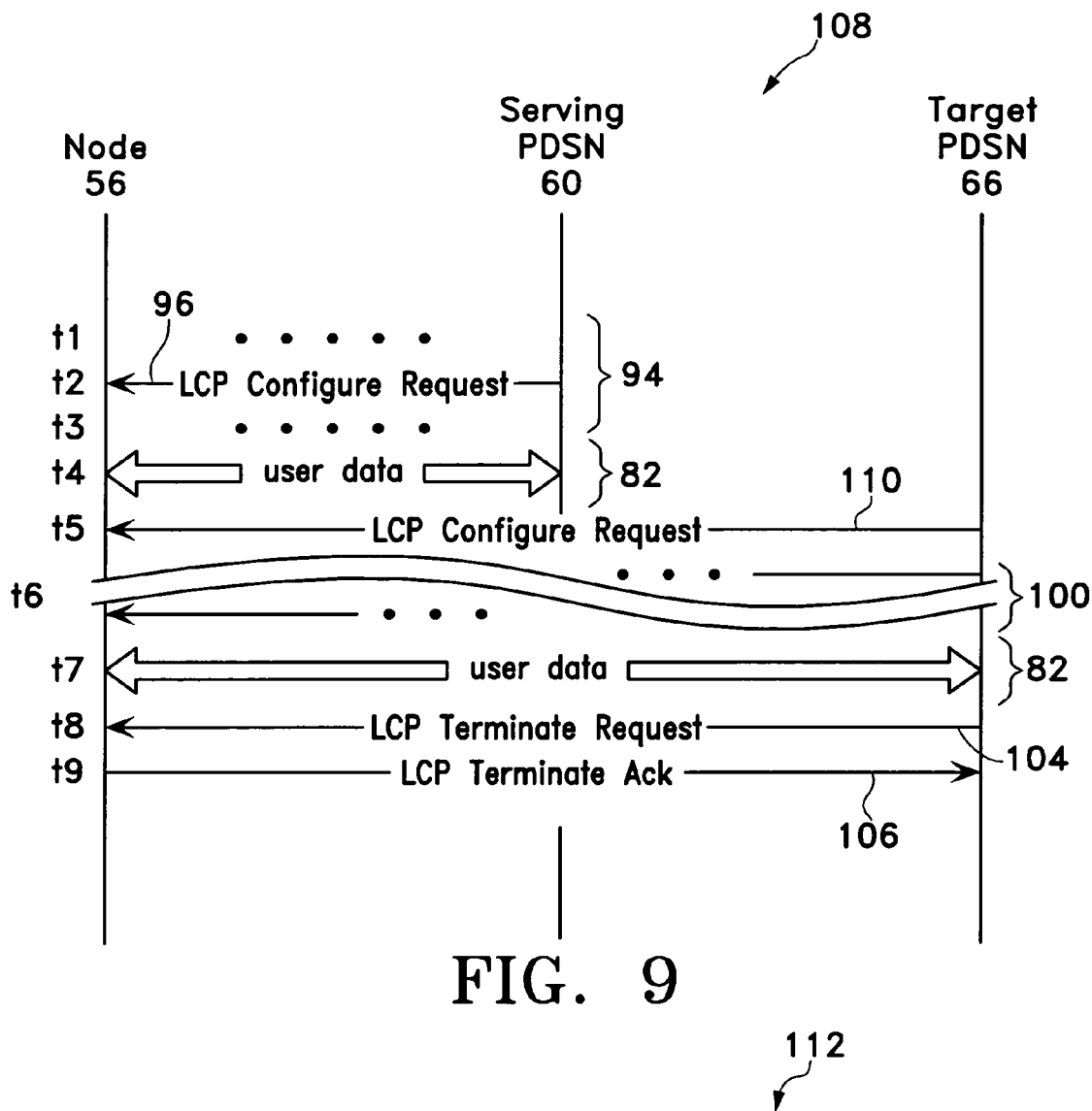
FIG. 9 is a communication sequence diagram showing the steps involved in accordance with a second handoff scheme used in the exemplary embodiment of the invention.

FIG. 9 shows the second scheme generally signified by the reference numeral 108. Reference is now made to FIG. 4 in conjunction with FIG. 9. As in the previous example, the node 56 first goes through a link protocol session 94 prior to network access via the serving PDSN 60. Again, to ensure a better chance of linking the node 56, a LCP Configure Request message 96 is also sent by the PDSN 60 at the time period t2 during the session 94, as explained previously. Upon successful execution of the non-PPP network interface layer protocol session 94, user data 82 is exchanged at the time period t4, as shown in FIG. 9. Again, suppose in the midst of flowing of user data 82, the node 56 starts to migrate away from the network 46 toward the network 48. In this example, the node 56 receives an indication for handoff, which indication is different from that of the previous example.

Specifically, when the node 56 reaches the territory of the network 48, the node 56 receives another LCP Configure Request message 110, at the time period t5 as shown in FIG. 9. This time, the node 56 can distinguish the origin of the LCP Configure Request message 110 at the time period t5 from the LCP Configure Request message 96 at the time period t2, based on the different message IDs (Identifications) in the messages 110 and 96, as explained below.

At this juncture, it helps to make a digression to explain the data frame format of a PPP message.

Figure 10:
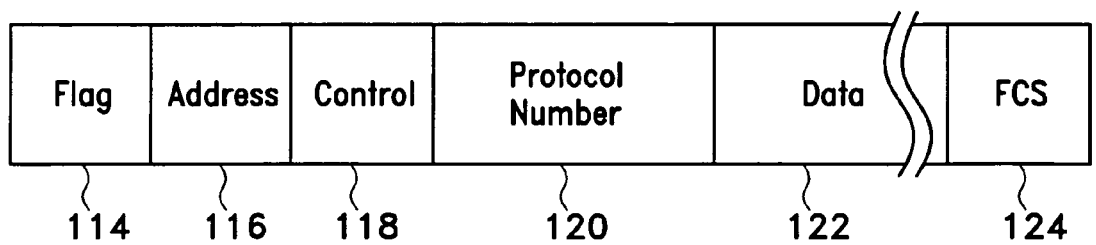
FIG. 10 is a schematic drawing of the data frame format used in the network interface layer protocols of FIGS. 2 and 6.

FIG. 10 shows the data frame format, having HDLC (High Level Data Link Control)—like framing, used in the PPP.

The frame template for the data packet is generally signified by the reference numeral 112, which is basically as packet template as specified under RFC 1662 for the PPP. More particularly, the data frame 112 includes a flag field 114, an address field 116, a control field 118, a protocol number field 120, a data field 122, and a FCS (Frame Check Sequence) field 124.

To be backward compatible with the PPP, most network interface layer protocols intended to replace the PPP also are designed with frame formats more or less similar to the frame format 112 for the PPP. For instance, the link protocol 75 disclosed in the '068 patent application shown in FIG. 6 may adopt the frame format similar to that of the PPP.

Reference is now returned to FIG. 10.

The flag field 114 is one-byte long and indicates the start of a data packet frame. The flag field 114 always assumes the hexadecimal value of 7E and is the same value used for the link process 54 and the PPP, as required by the RFC 1662.

The address field 116 is also one-byte long and is always set to the hexadecimal value of FF, as also set forth in the RFC 1662.

The control field 118 is one-byte long and is fixed at the hexadecimal value of 03, as also mandated by the RFC 1662.

In the protocol number field 120, the value in this field indicates what the data packet 112 is. The protocol number field 120 is two-byte in length. For example, as defined in RFCs 1661 and 1662, each of the LCP messages, such as the LCP Configure Request message (FIG. 2), has a hexadecimal value of C021. To distinguish one PPP message over the other, such as the LCP Configure Request message and the LCP Configure Nak message (FIG. 2), different message IDs are included in the Data field 122, as will be explained later. As for other link protocols designed to replace the PPP, such as the protocol 75 disclosed in the '068 application shown in FIG. 6, different protocol numbers 120 are used so as to distinguish from other PPP messages. For instance, in the link process 75 shown in FIG. 6, the Sync message 76, the Request message 78 or the Reply message 80, used in the link process 75 (FIG. 6) has a unique protocol value different from that of any of the protocol values used in the PPP. As such, it can easily be differentiated that whether the data packet 112 is a PPP packet or a non-PPP packet.

The data field 122 has a length which ranges from zero to more bytes of payload that contains either data or control information. For instance, if the value in the protocol number field 120 is with a value that indicates that the data packet 112 is the LCP Configure Request message 96 or 110 (FIG. 9), the data field 122 includes all the essential communication parameter options associated with establishing the link 58 or 90, respectively. As another example, if the value in the protocol number field 120 has a value that indicates that the data packet 112 is user data 82 or 100 (FIG. 9), the IP data packet generated from Layer 3 is entirely encapsulated into the data field 122.

The FCS field 124 ranges from two to four bytes in length and contains codes, such as the CRC (Cyclic Redundancy Code), for the frame 112 to provide basic protection against errors during transmission.

Figure 1:
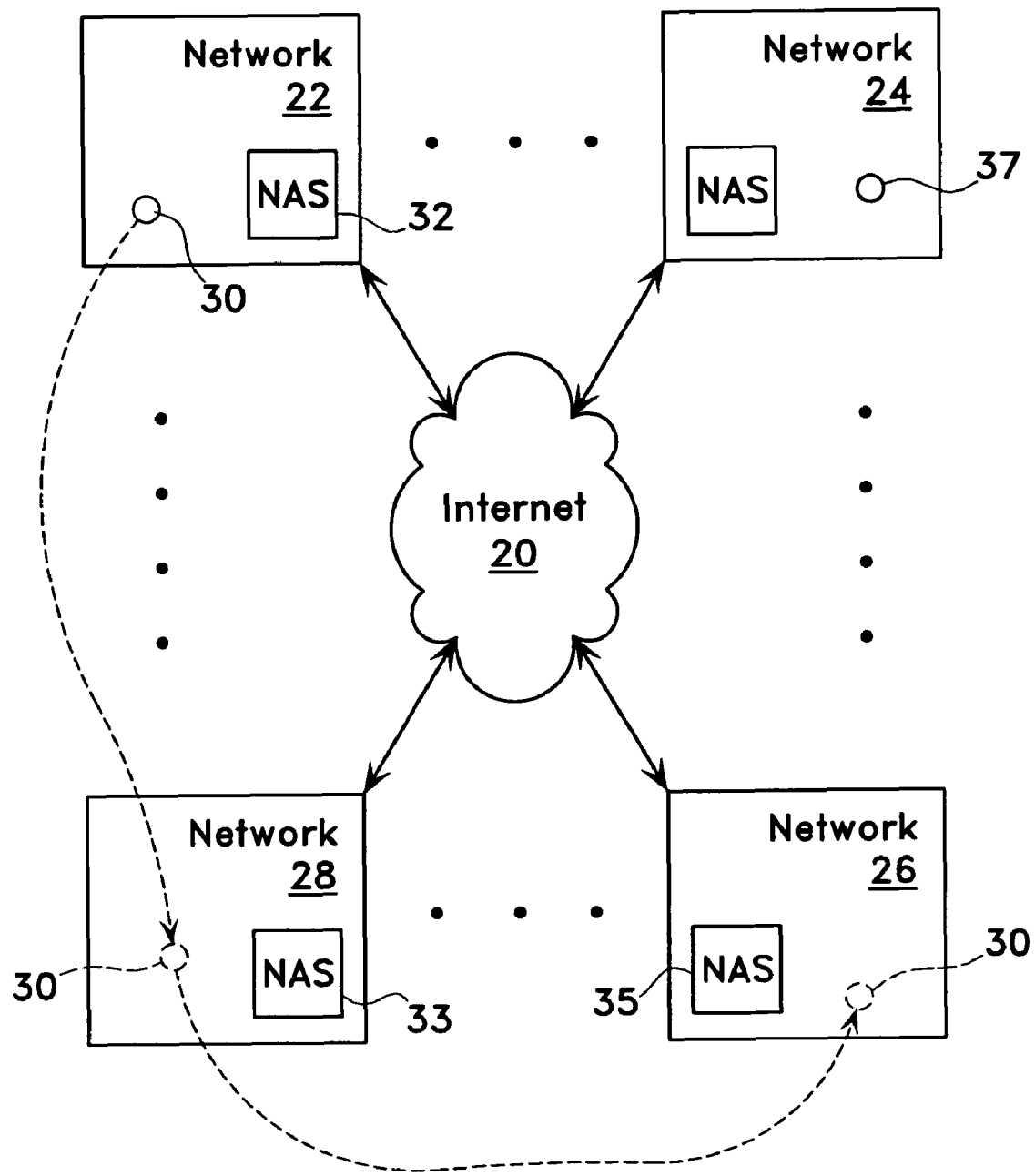
FIG. 1 is a schematic drawing of the global connection of networks.
Figure 2:
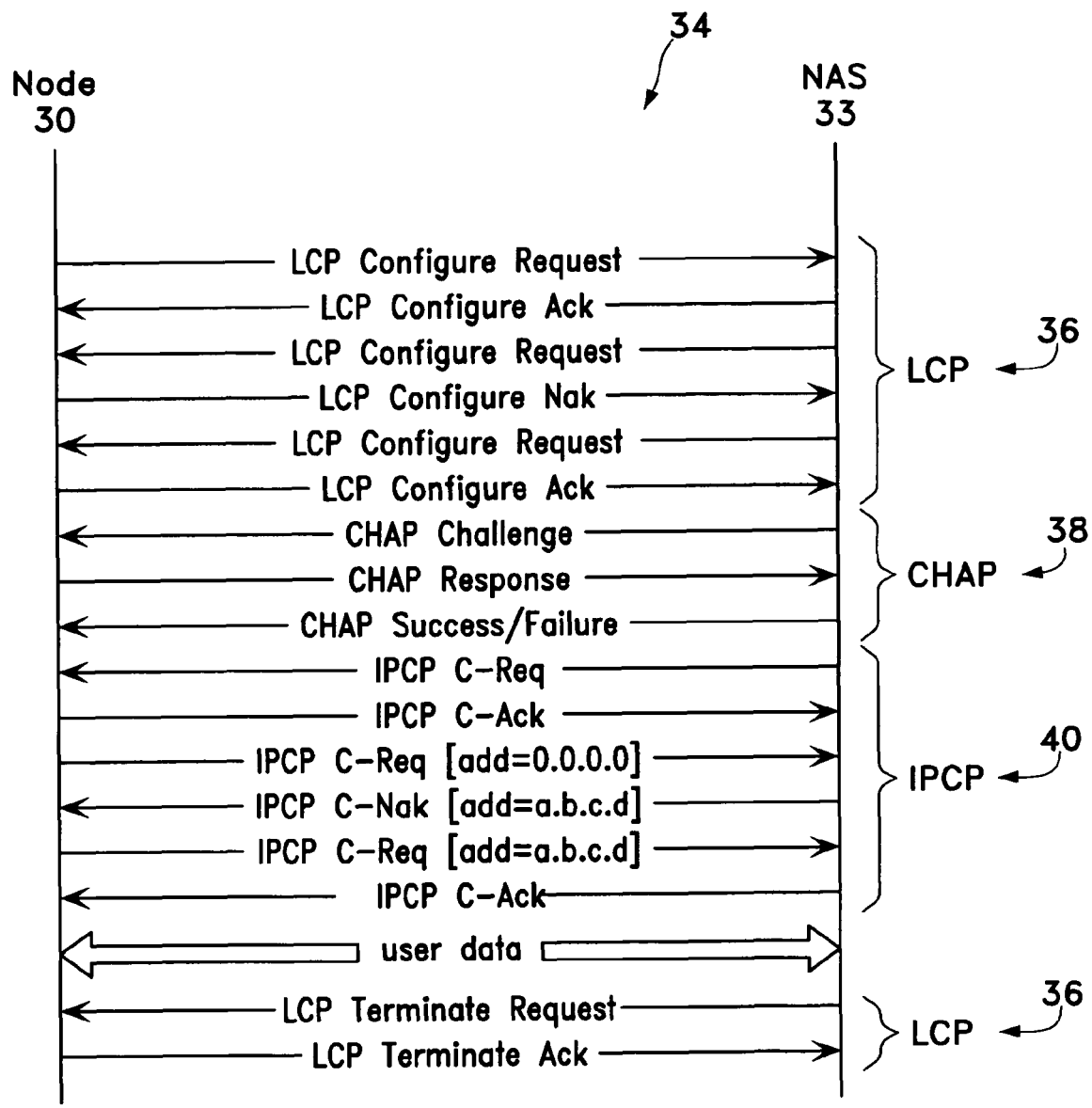
FIG. 2 is a communication sequence diagram of a communication session of a conventional network interface layer protocol.

Reference is now returned to FIG. 9. As mentioned earlier, the data field 122 includes a message ID, called a "code" under the RFC 1661, distinguishing one PPP message type from another, such as between a LCP Configure Request and a LCP Configure Ack message (FIG. 2). Further distinction can also be made in the message ID within the same message type, for example by attaching a sub-ID, called an "identifier" under the RFC 1661. For instance, the LCP Configure Request message 96 and the LCP Configure Request message 110 in the process 108 shown in FIG. 9 can be implemented with different codes, or alternatively with the same code but different identifiers characteristic of the networks. As such, the networks 48 and 46 can be designed to send out different LCP Configure messages 96 and 110, respectively, by including different codes or identifiers embedded in the data field 122 of the data packet 112 (FIG. 10). Consequently, in this example, when the node 56 migrates from the network 46 to the network 48, by recognizing the LCP Configure Request message with an identifier different from that of the network 48, the node 56 knows that it is in the territory of the network 48.

While in the network 48, the node 56 receives no non-PPP message but instead receives a LCP Configure Request message 110 which is a PPP message, and with a different identifier from that of the LCP Configure Request message 96, the node 56 knows that the network 48 does not support any non-PPP as its link establishment protocol. Promptly, the node 56 orients itself to respond to the LCP Configure Request message 110. PPP negotiation 100 is thereafter carried out as shown in FIG. 9. The rest of the process 108 is substantially similar to that of the process 92 shown in FIG. 7 described previously and is not further repeated.

Figures 11, 11A:
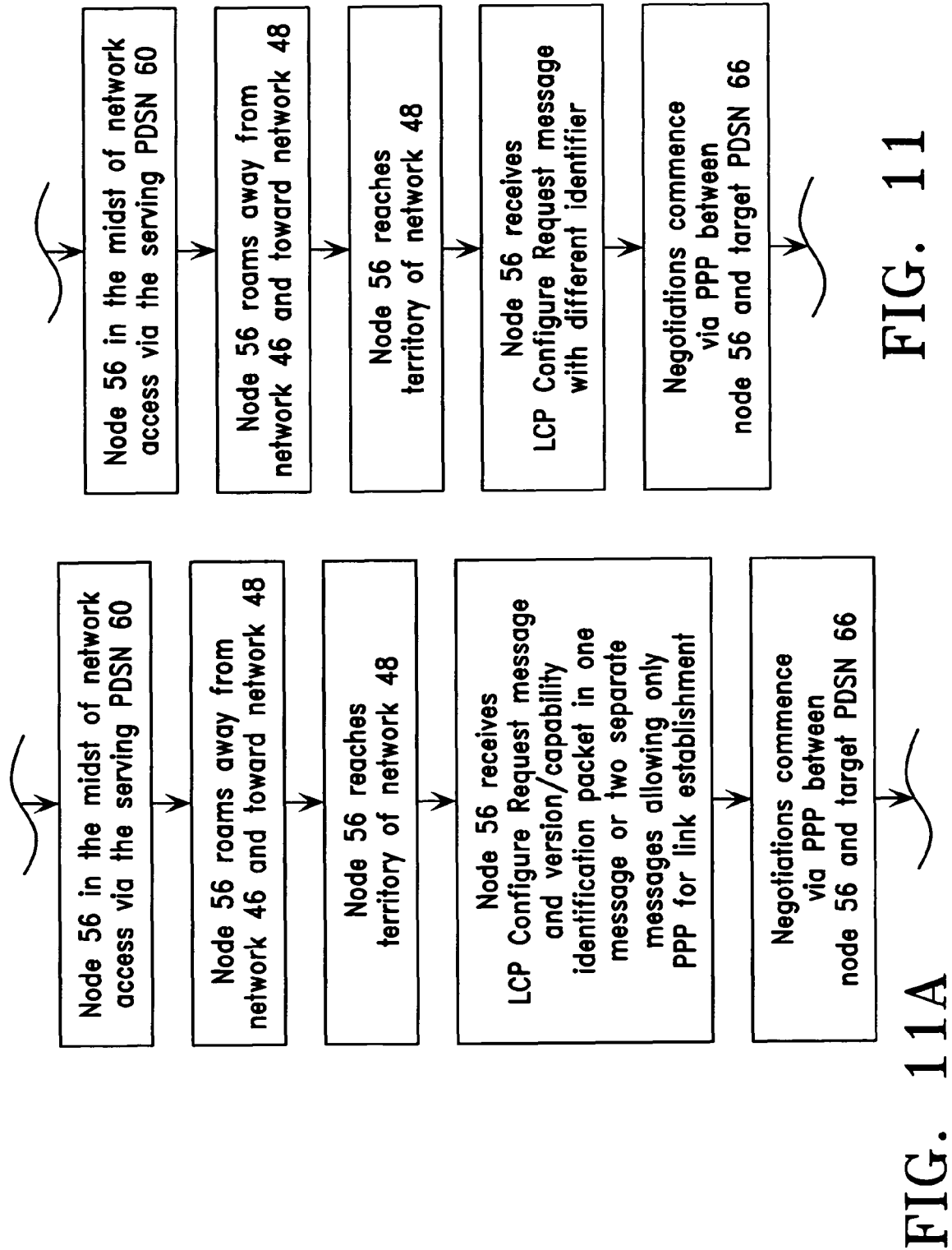
FIG. 11 is a flowchart of the handoff scheme of the communication sequence diagram shown in FIG. 9.
FIG. 11A is a flowchart of a variant of the handoff scheme of the communication sequence diagram shown in FIG. 7.

Relevant steps of the second handoff scheme in accordance with this embodiment are shown in the flowchart of FIG. 11.

As an alternative, a version/capability identification packet can be inserted in the data field 122 of the data packet 112. Under the cdma2000 standards promulgated by the 3GPP2, a version/capability identification packet can be included, as specified in a document by the 3GPP2, entitled "Wireless IP Network Standard," TIA-835D. The version/capability identification packet basically is a vendor-specific packet, as the name implies, that identifies the relevant information of a specific vendor of a node, such as the node 56 or the PDSN 60 or 66 shown in FIG. 4. The version/capability identification packets are primarily exchanged during the LCP phase of a PPP session. The purpose of exchanging the version/capability identification packets is to avoid unnecessary negotiation steps during the PPP session on unsupported features by either node, once the negotiating nodes specify their versions and capabilities early in the negotiation process.

By way of example, suppose the node 56 in FIG. 9 at the time period t2 receives the LCP Configure Request message 96 with a version/capability identification packet including information that does not rule out the use of any non-PPP, the node 56 at time period t3 thereby does not immediately resort to the use of the PPP for link establishment. Instead, the node 56 continues with the non-PPP link establishment process 94 at the time period t3. On the other hand, if the node 56 at the time period t5 receives the LCP Configure Request message 110 with a version/capability identification packet having information that allows only the use of the PPP, then the node 56 immediately orients itself to negotiate with the target node 66 via the PPP at the time period t6.

Alternatively, a separate version/capability identification packet may be sent out prior to the LCP Configure Request message 96 or 110. Thus, for example, at the time period t5, two messages may be sent out by the Target PDSN 66. The first message is the version/capability identification packet with the vendor specific information included in the data field 122 of the data packet 112 (FIG. 10), as described above. The second message may be the regular LCP Configure Request message, such as the first LCP Configure Request message during the LCP negotiation phase 36 of the PPP session 34 shown in FIG. 2.

Relevant steps of the handoff scheme as depicted immediately above are shown in the flowchart of FIG. 11A.

Figure 12:
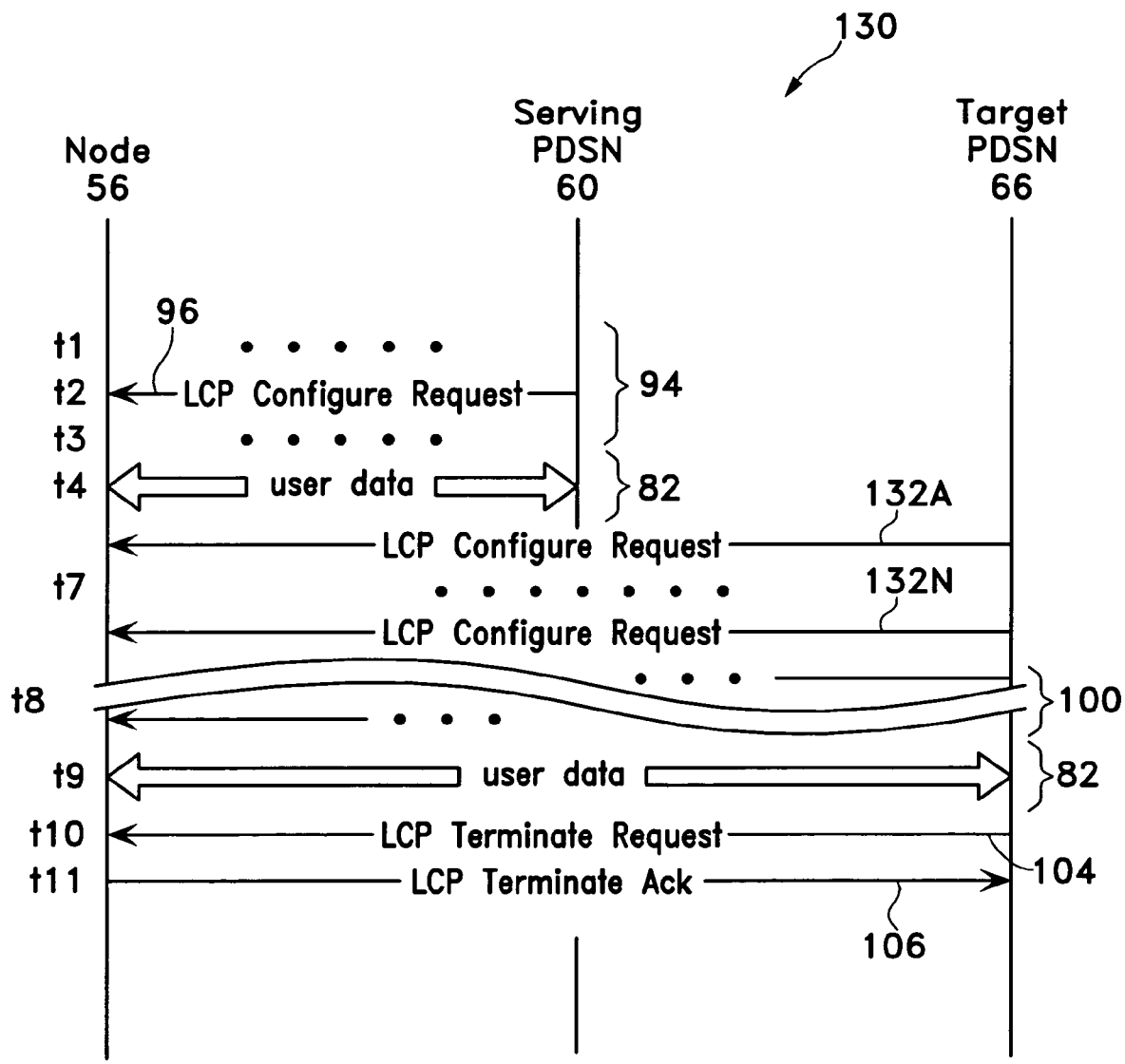
FIG. 12 is a communication sequence diagram showing the steps involved in accordance with a third handoff scheme used in the exemplary embodiment of the invention.

FIG. 12 shows yet another handoff scheme generally signified by the reference numeral 130. Reference is now made to FIG. 12 in conjunction with FIG. 4. As in the previous scheme, while in the network 46, the node 56 needs to go through a link establishment session 94 with the PDSN 60 prior to network access. Again, to ensure a better chance of linking the node 56, a LCP Configure Request message 96 is also sent by the serving PDSN 60 in the network 46 at the time period t2 during the session 94, as also explained previously. It should be noted that, at this time, the LCP Configure Request message 96 is sent out in the midst of other non-PPP messages of the link establishment session 94. Upon successful execution of the non-PPP network interface layer protocol session 94, user data 82 is exchanged at the time period t4 in a manner similarly described previously and as shown in FIG. 12. Again, suppose in the middle of exchanging user data 82, the node 56 starts to roam away from the network 46 toward the network 48.

When the node 56 reaches the territory of the network 48, this time, the node 56 receives a plurality of LCP Configure Request messages 132A-132N, at the time period t7, as shown in FIG. 12. In this example, the node 56 can distinguish the origin of the LCP Configure Request message 96 out of the network 46 at the time period t2 from the LCP Configure Request messages 132A-132N out of the network 48 at the time period t7, based on the message sending patterns. More specifically, at the time period t2, the node 56 receives one LCP Configure message 96 in the midst of other non-PPP messages of the link establishment session 94. In contrast, at the time period t7, the node 56 receives a plurality of LCP Configure messages 132A-132N.

Thus, relying on the pattern of receipt of the LCP Configure Request messages, the node 56 knows whether the network the node 56 is currently in supports non-PPP or not. For instance, the node 56 may be programmed to respond only to the second consecutive LCP Configure Request message. Thus, in this case, at the time period t2, when the node 56 receives the LCP Configure Request message 96, the node 56 waits for the next incoming message. If the next incoming message is not a repetition of the LCP Configure Request message 96, the node 56 knows that the network 46 supports other non-PPPs other than PPP and simply ignore the LCP Configure Request message 96 at the time period t2 and continues with the non-PPP link session 94 as described previously.

On the other hand, if the node 56 receives more than one consecutive LCP Configure Request message 132A-132N, for example, during the time period t7, the nodes 56 knows that the network sending out the messages, the network 48 in this case, supports only the PPP and no other network interface layer protocol. The node 56 immediately resorts to communicate with the target PDSN 66 through the RAN 68 in the network 48 via the PPP, as shown in FIG. 12. The rest of the process 130 is substantially similar to that of the processes 92 and 108 shown respectively in FIG. 7 and FIG. 9 described previously, and is thus not further repeated.

It should be noted that the number of LCP Configure Request messages 132A-132N setting off response by node 56 should be configurable. For example, instead of starting the PPP negotiation 100 with the target PDSN 66 by the node 56 after the second LCP Configure Request message 132B as described in the example above, the node 56 can well start the PPP negotiation 100 after the $i^{th}$ LCP Configure Request message 132$i$, where i ranges from 2 to N with N being an integer greater than 2.

Figure 13:
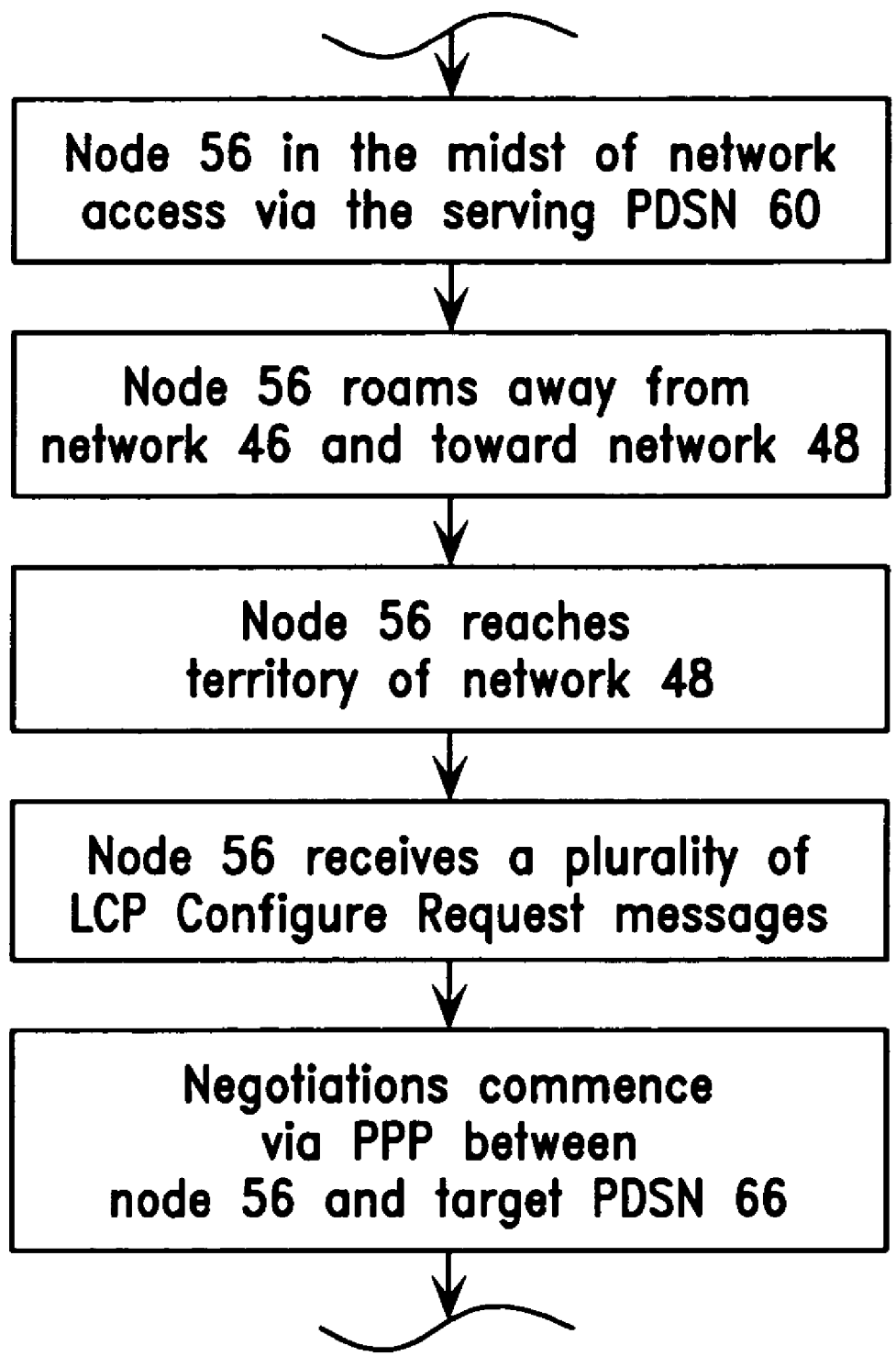
FIG. 13 is a flowchart of the handoff scheme of the communication sequence diagram shown in FIG. 12.

Relevant steps of the third handoff scheme in accordance with this embodiment are shown in the flowchart of FIG. 13.

Figure 14:
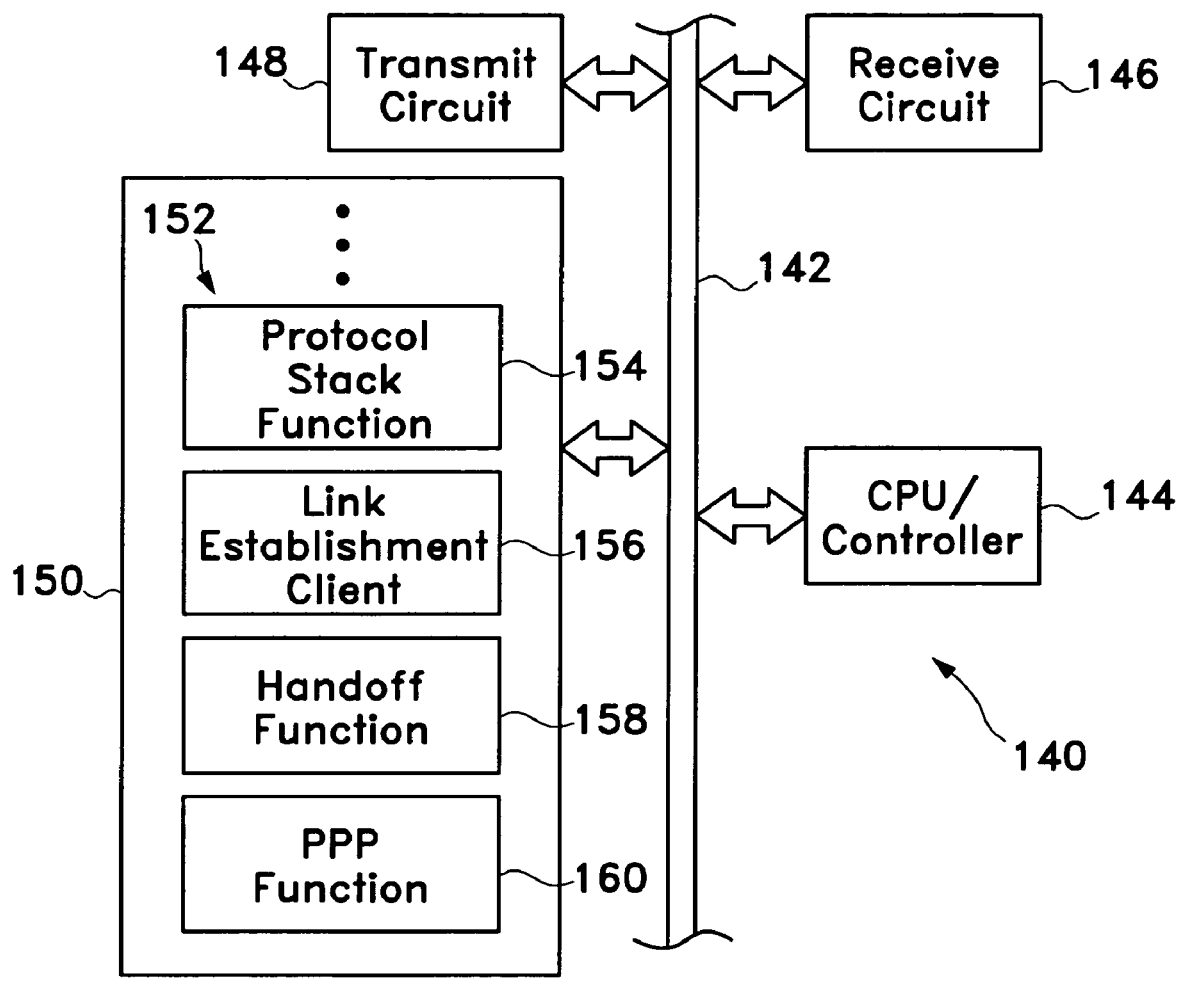
FIG. 14 is a schematic drawing of part of the circuitry of a node seeking network access in accordance with the exemplary embodiment.

FIG. 14 schematically shows the part of the hardware implementation of an apparatus, such as the node 56 shown in FIG. 4, signified by the reference numeral 140 in accordance with the exemplary embodiment of the invention. The apparatus 140 can be built and incorporated in various forms, such as a laptop computer, a PDA, or a cellular phone, to name just a few.

The apparatus 140 comprises a central data bus 142 linking several circuits together. The circuits include a CPU (Central Processing Unit) or a controller 144, a receive circuit 146, a transmit circuit 148, and a memory unit 150.

If the apparatus 140 is part of a wireless device, the receive and transmit circuits 146 and 148 can be connected to a RF (Radio Frequency) circuit but is not shown in the drawing. The receive circuit 146 processes and buffers received signals before sending out to the data bus 142. On the other hand, the transmit circuit 148 processes and buffers the data from the data bus 142 before sending out of the device 140. The CPU/controller 144 performs the function of data management of the data bus 142 and further the function of general data processing, including executing the instructional contents of the memory unit 140.

Instead of separately disposed as shown in FIG. 14, as an alternative, the transmit circuit 148 and the receive circuit 146 can be parts of the CPU/controller 144.

The memory unit 150 includes a set of instructions generally signified by the reference numeral 152. In this embodiment, the instructions include, among other things, portions such as the protocol stack function 154, link establishment client 156, link handoff function 158, and PPP function 160. The protocol stack function 154 runs the protocol stack similar to the stack 74 as shown and described in FIG. 5 previously. The link establishment client 156 includes the instructional sets for establishing one or more link processes, other than the PPP link process, such as the process 94 as shown in FIGS. 7, 9 and 12 described above. The PPP function 160 includes the instructional sets for allowing the apparatus 140 to execute the PPP process. The link handoff function 158 includes instructional sets for executing the handoff process, such as the process 92, 108 and 130, described and shown in the relevant figures of FIGS. 7-13. The PPP function 160 can be used independently for a network which supports both the PPP or non-PPP link process, or as a fallback in the event that the network does not support other non-PPP link processes, as also described above.

In this embodiment, the memory unit 150 is a RAM (Random Access Memory) circuit. The exemplary instruction portions 154, 156, 158 and 160 are software routines or modules. The memory unit 150 can be tied to another memory circuit (not shown) which can either be of the volatile or nonvolatile type. As an alternative, the memory unit 150 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the processes 92, 108 and 130 as described and shown in FIGS. 7-13, 15 and 16 above can also be coded as computer-readable instructions carried on any computer-readable medium known in the art. In this specification and the appended claims, the term "computer-readable medium" refers to any medium that participates in providing instructions to any processor, such as the CPU/controller 144 shown and described in FIG. 14, for execution. Such a medium can be of the storage type and may take the form of a volatile or non-volatile storage medium as also described previously, for example, in the description of the memory unit 150 in FIG. 14. Such a medium can also be of the transmission type and may include a coaxial cable, a copper wire, an optical cable, and the air interface carrying acoustic or electromagnetic waves capable of carrying signals readable by machines or computers.

Figure 15:
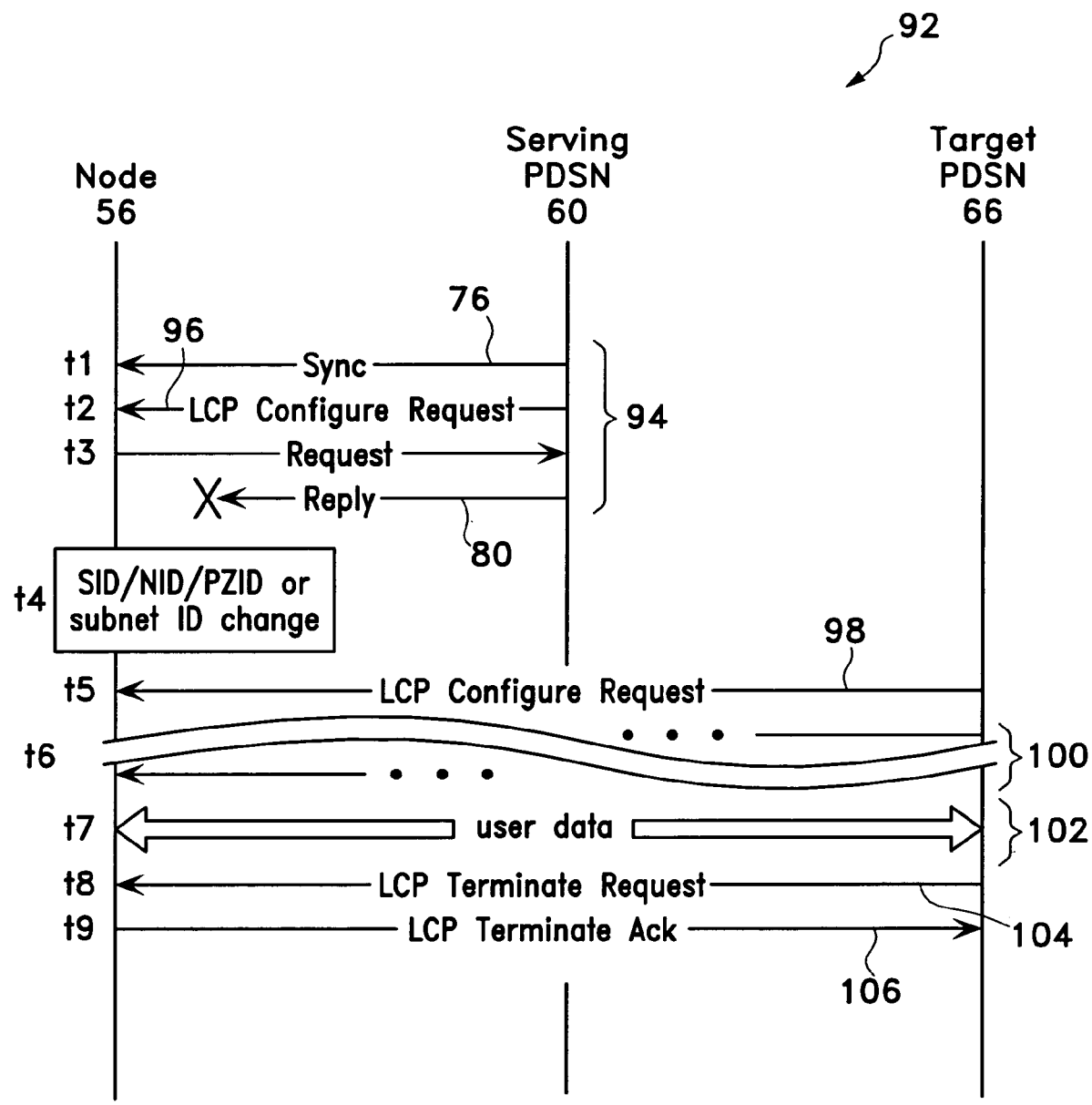
FIG. 15 is a communication sequence diagram showing the steps involved in which a handoff to a target network takes place in the midst of establishing a network interface layer protocol session with a serving network.
Figure 16:
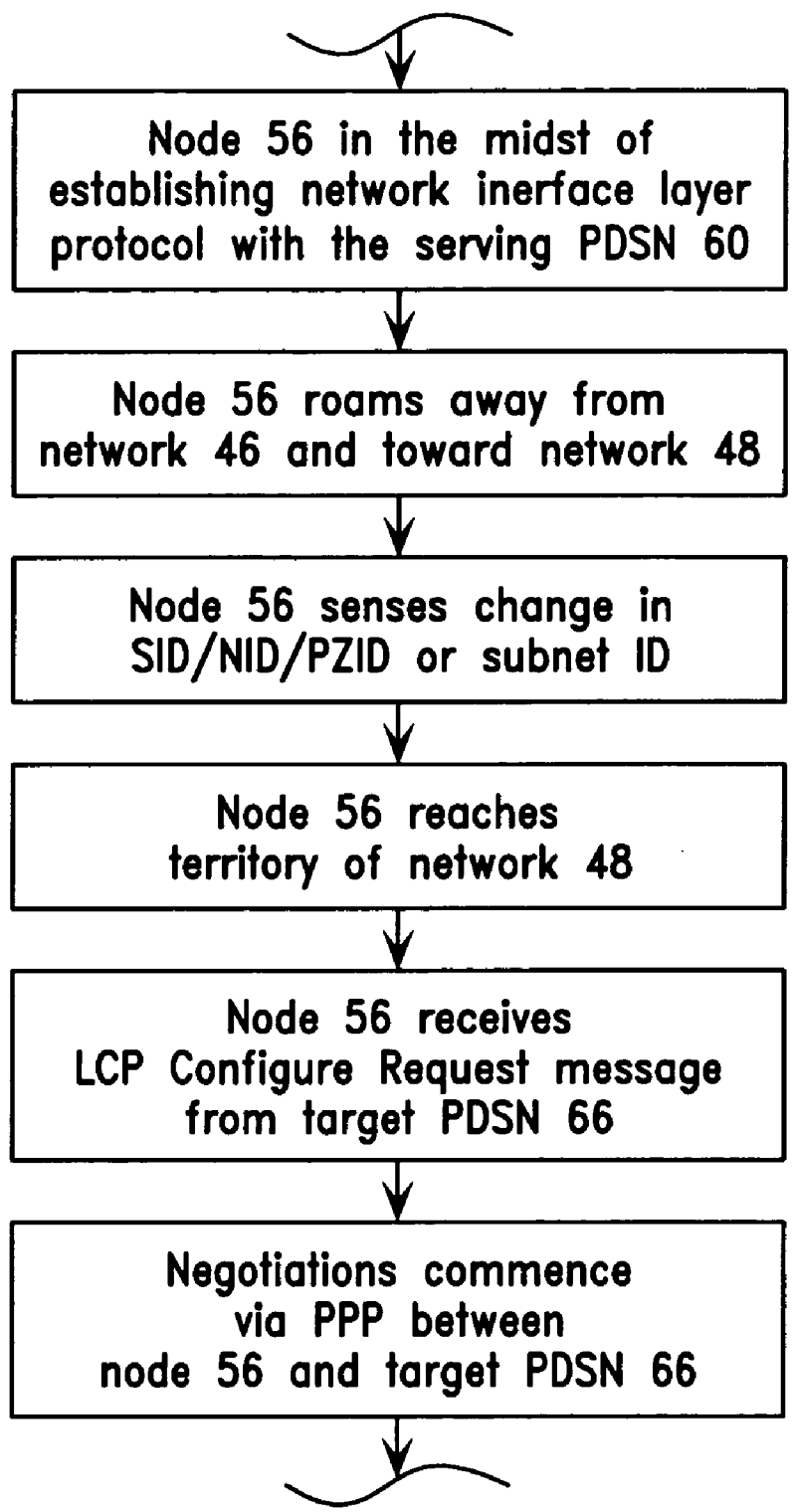
FIG. 16 is a flowchart of the handoff process illustrated in the communication sequence diagram shown in FIG. 15.

Finally, described in the embodiment, the handoff procedures are depicted as executing in the middle of exchanging of user data 82 (e.g., see FIGS. 7, 9 and 12). This need not be the case. It is possible that a handoff takes place when the node 56 is in the midst of establishing a network interface layer protocol session 94. FIG. 15 shows such a scenario in which the link process 92 as shown and described in FIG. 7 is highlighted and some relevant steps are repeated for purpose of illustration. As shown, at the time period t4 before the completion of the link establishment process 94, the node 56 is in the process of migrating to the network 48 and further senses a SID, NID, PZID or Subnet ID change at the time period t4. As such, the node 56 may not possibly receive the Reply message 80 from the PDSN 60 in the network 46 during the migration. However, when the node 56 receives a LCP Configure Request message 98 at the time period t5, the node 56 knows that it is in the territory of the network 48 and may immediately commence the PPP negotiation process 100 in a manner similarly described above. Furthermore, the same holds true for the processes 108 and 130 shown and described in FIGS. 9 and 12, respectively. That is, the handoff process in accordance with the exemplary embodiment of the invention need not necessarily take place only during exchanging of user data. In addition, the system 44 has been described as supporting the cdma2000 standards. Other standards are clearly applicable. An example of the other standards is the WCDMA (Wideband Code Division Multiple Access) promulgated by the 3GPP (Third Generation Partnership Project). In addition, in the exemplary embodiment, the Layer-3 protocol is described as the IP. The IP can be of different versions, such as the IPv4 (Internet Protocol version 4) and the IPv6 (Internet Protocol version 6). Furthermore, it should be noted that other Layer-3 protocols are equally applicable. For instance, the Layer-3 protocol can be the IPX (Internetworking Packet Exchange Protocol), Apple-Talk and various other network protocols of different versions. In addition, any logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method for handoff of a mobile node from a serving node to a target node in a communication system, comprising:
   accessing said serving node via a first network interface layer protocol;
   receiving an indication for said handoff; and
   accessing, in response to receiving an indication for handoff, said target node via a second network interface layer protocol,
   wherein said receiving said indication includes receiving a plurality of request messages of said second network interface layer protocol from said target node, and
   wherein said accessing said serving node includes the mobile node sending a set of parameter options for authentication, link configuration, and network access in one request message.

2. The method as in claim 1, wherein said receiving said indication includes receiving a message having an identification identifying said target node.

3. The method as in claim 1, wherein said receiving said indication includes receiving a data packet having a message identification in a data field of said data packet identifying said target node.

4. The method as in claim 1, wherein said receiving said indication includes receiving a data packet having a version/capability identification packet in a data field of said data packet identifying said target node.

5. The method as in claim 1 further including exchanging user data with said serving node after said accessing said serving node, wherein said receiving said indication for said handoff occurs in the midst of said exchanging said user data.

6. The method as in claim 1, wherein said receiving said indication for said handoff occurs in the midst of accessing said serving node via said first network interface layer protocol.

7. A method of handoff of a mobile node from a first node to a second node in a communication system which supports IP (Internet Protocol), comprising:
   accessing said first node via a network interface layer protocol other than a PPP (Point- to-Point Protocol);
   receiving an indication for said handoff; and
   accessing, in response to receiving an indication for handoff, said second node via said PPP,
   wherein said receiving said indication includes receiving from said second node a plurality of LCP (Link Control Protocol) Configure Request messages of said PPP, and
   wherein said accessing said first node includes the mobile node sending a set of parameter options for authentication, link configuration, and network access in one request message.

8. The method as in claim 7, wherein said receiving said indication includes receiving a message having a message identification identifying said second node, said message identification being selected from a group consisting of an NID (Network Identification), SID (System Identification), PZID (Packet Zone Identification) and Subnet ID (Subnet Identification) associated with said second node.

9. The method as in claim 7, wherein said receiving said indication includes receiving a data packet having a code or an identifier included in a data field of said data packet identifying said second node.

10. The method as in claim 7, wherein said receiving said indication includes receiving a data packet having a version/capability identification packet included in a data field of said data packet identifying said second node.

11. An apparatus in a communication system, comprising:
   means for accessing a serving node in said communication system via a first network interface layer protocol;
   means for receiving an indication for a handoff; and
   means for accessing, in response to receiving an indication for handoff, a target node via a second network interface layer protocol,
   wherein said indication includes a plurality of request messages of said second network interface layer protocol from said target node, and
   wherein said accessing said serving node includes the apparatus sending a set of parameter options for authentication, link configuration, and network access in one request message.

12. The apparatus as in claim 11, wherein said indication includes an identification in a message identifying said target node.

13. The apparatus as in claim 11, wherein said indication includes a message identification in a data field of a data packet identifying said target node.

14. The apparatus as in claim 11, wherein said indication includes a version/capability identification packet in a data field of a data packet identifying said target node.

15. An apparatus in a communication system which supports the IP (Internet Protocol), comprising:
   means for accessing a first node via a network interface layer protocol other than a PPP (Point-to-Point Protocol);
   means for receiving an indication for a handoff; and
   means for accessing, in response to receiving an indication for handoff, a second node via said PPP,
   wherein said indication includes a plurality of LCP (Link Control Protocol) Configure Request messages of said PPP from said second node, and
   wherein said accessing said first node includes the apparatus sending a set of parameter options for authentication, link configuration, and network access in one request message.

16. The apparatus as in claim 15, wherein said indication includes a message having a message identification identifying said second node, said message identification being selected from a group consisting of an NID (Network Identification), SID (System Identification), PZID (Packet Zone Identification) and Subnet ID (Subnet Identification) associated with said second node.

17. The apparatus as in claim 15, wherein said indication includes a data packet having a code or an identifier included in a data field of said data packet identifying said second node.

18. The apparatus as in claim 15, wherein said indication includes a data packet having a version/capability identification packet included in a data field of said data packet identifying said second node.

19. An apparatus in a communication system, comprising:
   a memory unit including computer-readable instructions for accessing a serving node of said communication system via a first network interface layer protocol, receiving an indication for a handoff, and accessing, in response to receiving an indication for handoff, a target node of said communication system via a second network interface layer protocol; and
   a processor circuit coupled to said memory unit for processing said computer-readable instructions,
   wherein said indication includes a plurality of request messages of said second network interface layer protocol from said target node, and
   wherein said accessing said serving node includes the apparatus sending a set of parameter options for authentication, link configuration, and network access in one request message.

20. The apparatus as in claim 19, wherein said indication includes a message having an identification identifying said target node.

21. The apparatus as in claim 19, wherein said indication includes a data packet having a message identification in a data field of said data packet identifying said target node.

22. The apparatus as in claim 19, wherein said indication includes a data packet having a version/capability identification packet in a data field of said data packet identifying said target node.

23. The apparatus as in claim 19, wherein said indication includes a plurality of request messages of said second network interface layer protocol from said target node.

24. The apparatus as in claim 19, wherein said memory unit further includes computer-readable instructions for exchanging user data with said serving node after said accessing said serving node, and computer-readable instructions for commencing said handoff based on said indication being received in the midst of said exchanging said user data.

25. The apparatus as in claim 19, wherein said memory unit further includes computer-readable instructions for commencing said handoff based on said indication being received in the midst of said accessing said serving node via said first network interface layer protocol.

26. An apparatus in a communication system which supports the IP (Internet Protocol), comprising:
   a memory unit including computer-readable instructions for accessing a first node via a network interface layer protocol other than a PPP (Point-to-Point Protocol), receiving an indication for a handoff, and accessing, in response to receiving an indication for handoff, a second node via said PPP; and
   a processor circuit coupled to said memory unit for processing said computer-readable instructions,
   wherein said indication includes a plurality of LCP (Link Control Protocol) Configure Request messages of said PPP from said second node, and
   wherein said accessing said serving node includes the apparatus sending a set of parameter options for authentication, link configuration, and network access in one request message.

27. The apparatus as in claim 26, wherein said memory unit further includes computer-readable instructions for providing the set of parameter options for authentication, link configuration, and network access in the request message during said accessing said second node.

28. The apparatus as in claim 26, wherein said indication includes a message having a message identification identifying said second node, said message identification being selected from a group consisting of an NID (Network Identification), SID (System Identification), PZID (Packet Zone Identification) and Subnet ID (Subnet Identification) associated with said second node.

29. The apparatus as in claim 26, wherein said indication includes a data packet having a code or an identifier included in a data field of said data packet identifying said second node.

30. The apparatus as in claim 26, wherein said indication includes a data packet having a version/capability identification packet included in a data field of said data packet identifying said second node.

31. A non-transitory computer-readable medium encoded with computer readable instructions for handoff of a mobile node in a communication system, comprising:
   at least one instruction operable to cause a computer to access a serving node via a first network interface layer protocol;
   at least one instruction operable to cause the computer to receive an indication for a handoff; and
   at least one instruction operable to cause the computer to access, in response to receiving an indication for handoff, a target node via a second network interface layer protocol,
   wherein said indication includes a plurality of request messages of said second network interface layer protocol from said target node, and
   wherein said at least one instruction operable to cause the computer to access said serving node includes at least one instruction operable to cause the computer to send a set of parameter options for authentication, link configuration, and network access in one request message.

32. The computer-readable medium as in claim 31, wherein said at least one instruction operable to cause the computer to receive said indication includes at least one instruction operable to cause the computer to receive a message having an identification identifying said target node.

33. The computer-readable medium as in claim 31, wherein said at least one instruction operable to cause the computer to receive said indication includes at least one instruction operable to cause the computer to receive a data packet having a message identification in a data field of said data packet identifying said target node.

34. The computer-readable medium as in claim 31, wherein said at least one instruction operable to cause the computer to receive said indication includes at least one instruction operable to cause the computer to receive a data packet having a version/capability identification packet in a data field of said data packet identifying said target node.

35. The computer-readable medium as in claim 31, further including at least one instruction operable to cause the computer to exchange user data with said serving node after said accessing said serving node, wherein said indication for said handoff being received in the midst of said exchanging said user data.

36. The computer-readable medium as in claim 31, wherein said indication for said handoff being received in the midst of accessing said serving node via said first network interface layer protocol.

37. A non-transitory computer-readable medium encoded with computer readable instructions for handoff of a mobile node in a communication system which supports IP (Internet Protocol), comprising:
   at least one instruction operable to cause a computer to access a first node via a network interface layer protocol other than a PPP (Point-to-Point Protocol);
   at least one instruction operable to cause the computer to receive an indication for a handoff; and
   at least one instruction operable to cause the computer to access, in response to receiving the indication for handoff, a second node via said PPP,
   wherein said at least one instruction operable to cause the computer to receive said indication includes at least one instruction operable to cause the computer to receive from said second node a plurality of LCP (Link Control Protocol) Configure Request messages of said PPP, and
   wherein said at least one instruction operable to cause the computer to access said first node includes at least one instruction operable to cause the computer to send a set of parameter options for authentication, link configuration, and network access in one request message.

38. The computer-readable medium as in claim 37, wherein said at least one instruction operable to cause the computer to receive said indication includes at least one instruction operable to cause the computer to receive a message having a message identification identifying said second node, said message identification being selected from a group consisting of an NID (Network Identification), SID (System Identification), PZID (Packet Zone Identification) and Subnet ID (Subnet Identification) associated with said second node.

39. The computer-readable medium as in claim 37, wherein said at least one instruction operable to cause the computer to receive said indication includes at least one instruction operable to cause the computer to receive a data packet having a code or an identifier included in a data field of said data packet identifying said second node.

40. The computer-readable medium as in claim 37, wherein said at least one instruction operable to cause the computer to receive said indication includes at least one instruction operable to cause the computer to receive a data packet having a version/capability identification packet included in a data field of said data packet identifying said second node.

41. At least one processor for handoff of a mobile node from a serving node to a target node in a communication system, comprising:
 a first processor module, comprising hardware, for accessing a serving node via a first network interface layer protocol;
 a second processor module for receiving an indication for a handoff; and
 a third processor module for accessing, in response to receiving an indication for handoff, a target node via a second network interface layer protocol,
 wherein said second processor module for receiving said indication is further configured for receiving a plurality of request messages of said second network interface layer protocol from said target node, and
 wherein said first processor module for accessing said serving node is further configured for sending a set of parameter options for authentication, link configuration, and network access in one request message.

42. The at least one processor of claim 41, wherein said second processor module for receiving said indication includes receiving a message having an identification identifying said target node.

43. The at least one processor of claim 41, wherein said second processor module for receiving said indication includes receiving a data packet having a message identification in a data field of said data packet identifying said target node.

44. The at least one processor of claim 41, wherein said second processor module for receiving said indication includes receiving a data packet having a version/capability identification packet in a data field of said data packet identifying said target node.

45. The at least one processor of claim 41, further including a fourth processor module for exchanging user data with said serving node after said accessing said serving node, wherein said receiving said indication for said handoff occurs in the midst of said exchanging said user data.

46. The at least one processor of claim 41, wherein said receiving said indication for said handoff occurs in the midst of accessing said serving node via said first network interface layer protocol.

47. At least one processor for handoff of a mobile node in a communication system which supports IP (Internet Protocol), comprising:
 a first processor module, comprising hardware, for accessing a first node via a network interface layer protocol other than a PPP (Point-to-Point Protocol);
 a second processor module for receiving an indication for a handoff; and
 a third processor module for accessing, in response to receiving the indication for handoff, a second node via said PPP,
 wherein said indication includes a plurality of LCP (Link Control Protocol) Configure Request messages of said PPP from said second node, and
 wherein said first processor module for accessing said first node is further configured for sending a set of parameter options for authentication, link configuration, and network access in one request message.

48. The at least one processor of claim 47, wherein said indication includes a message having a message identification identifying said second node, said message identification being selected from a group consisting of an NID (Network Identification), SID (System Identification), PZID (Packet Zone Identification) and Subnet ID (Subnet Identification) associated with said second node.

49. The at least one processor of claim 47, wherein said indication includes a data packet having a code or an identifier included in a data field of said data packet identifying said second node.

50. The at least one processor of claim 47, wherein said indication includes a data packet having a version/capability identification packet included in a data field of said data packet identifying said second node.

* * * * *